(12) United States Patent
Chung et al.

(10) Patent No.: US 9,530,012 B2
(45) Date of Patent: Dec. 27, 2016

(54) PROCESSING EXTENSIBLE MARKUP LANGUAGE SECURITY MESSAGES USING DELTA PARSING TECHNOLOGY

(71) Applicant: International Business Machines Corporation, Armonk, NY (US)

(72) Inventors: Hyen Vui Chung, Round Rock, TX (US); Satoshi Makino, Kanagawa-ken (JP); Masayoshi Teraguchi, Kanagawa-ken (JP); Kenichiro Ueno, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/540,826

(22) Filed: Nov. 13, 2014

(65) Prior Publication Data
US 2015/0095657 A1 Apr. 2, 2015

Related U.S. Application Data

(62) Division of application No. 13/456,097, filed on Apr. 25, 2012, now abandoned, which is a division of
(Continued)

(51) Int. Cl.
*G06F 21/60* (2013.01)
*G06F 17/22* (2006.01)
(Continued)

(52) U.S. Cl.
CPC ......... *G06F 21/602* (2013.01); *G06F 17/2211* (2013.01); *G06F 17/2247* (2013.01);
(Continued)

(58) Field of Classification Search
CPC ........ G06F 21/60; G06F 21/602; G06F 21/64; G06F 17/22; G06F 17/2247; G06F 17/2264; G06F 17/248; G06F 17/27; G06F 17/2705
See application file for complete search history.

(56) References Cited

U.S. PATENT DOCUMENTS 6,038,668 A 3/2000 Chipman et al.
6,907,564 B1 6/2005 Burchhardt et al.
(Continued)

FOREIGN PATENT DOCUMENTS

WO WO03073316 A1 9/2003
WO WO2005043327 A2 5/2005
WO WO2005064461 A1 7/2005

OTHER PUBLICATIONS

European Patent Office Communication, dated May 27, 2014, regarding Application No. EP08717781.2, 6 pages.
(Continued)

*Primary Examiner* — Zachary A Davis
(74) *Attorney, Agent, or Firm* — Yee & Associates, P.C.; Stephen R. Yoder

(57) ABSTRACT

Markup language security messages are processed. A template corresponding to a markup language security message is identified. The markup language security message is parsed for variable values using the template. A transition sequence is generated that represents the entire markup language security message. Each transition in the transition sequence is associated with a portion of the markup language security message. A lightweight data model of the markup language security message is populated using the transition sequence. The lightweight data model includes nodes for the variable values and a set of selected constant values.

7 Claims, 16 Drawing Sheets

Related U.S. Application Data application No. 11/690,434, filed on Mar. 23, 2007, now abandoned.

(51) Int. Cl.
  *G06F 17/27* (2006.01)
  *G06F 21/64* (2013.01)
  *G06F 17/24* (2006.01)

(52) U.S. Cl.
  CPC ........ *G06F 17/2264* (2013.01); *G06F 17/248* (2013.01); *G06F 17/2705* (2013.01); *G06F 21/64* (2013.01)

(56) References Cited

U.S. PATENT DOCUMENTS

| | | | |
|---|---|---|---|
| 6,934,740 | B1 | 8/2005 | Lawande et al. |
| 6,950,866 | B1 | 9/2005 | Lowry et al. |
| 6,993,657 | B1 | 1/2006 | Renner et al. |
| 6,996,773 | B2 | 2/2006 | Friedman et al. |
| 7,007,230 | B2 | 2/2006 | Friedman et al. |
| 7,165,063 | B2 | 1/2007 | Beyer et al. |
| 7,177,843 | B2 | 2/2007 | Nguyen et al. |
| 7,426,513 | B2 | 9/2008 | Gvily |
| 7,536,711 | B2 | 5/2009 | Miyashita et al. |
| 7,584,284 | B2 * | 9/2009 | Lee ............ H04L 67/02 709/227 |
| 7,650,432 | B2 | 1/2010 | Bosworth et al. |
| 7,660,828 | B2 | 2/2010 | Johnston et al. |
| 7,664,773 | B2 | 2/2010 | Hattori et al. |
| 7,681,118 | B1 * | 3/2010 | Dasari ............ G06F 17/2247 715/234 |
| 7,711,836 | B2 | 5/2010 | Videlov et al. |
| 7,774,831 | B2 | 8/2010 | Kuznetsov et al. |
| 7,836,393 | B2 | 11/2010 | Soderberg et al. |
| 7,882,149 | B2 | 2/2011 | Foster et al. |
| 8,074,287 | B2 | 12/2011 | Barde et al. |
| 8,166,053 | B2 | 4/2012 | Zhou et al. |
| 8,214,394 | B2 | 7/2012 | Krishnaprasad et al. |
| 8,413,041 | B2 | 4/2013 | Lee et al. |
| 2001/0032216 | A1 | 10/2001 | Duxbury |
| 2002/0065955 | A1 | 5/2002 | Gvily |
| 2003/0101184 | A1 | 5/2003 | Chiu et al. |
| 2003/0217096 | A1 | 11/2003 | McKelvie et al. |
| 2004/0002952 | A1 | 1/2004 | Lee et al. |
| 2004/0078788 | A1 | 4/2004 | Wong |
| 2004/0210599 | A1 | 10/2004 | Friedman et al. |
| 2005/0097455 | A1 | 5/2005 | Zhou et al. |
| 2005/0108209 | A1 | 5/2005 | Beyer et al. |
| 2005/0108632 | A1 | 5/2005 | Friedman et al. |
| 2005/0192983 | A1 | 9/2005 | Hattori et al. |
| 2005/0234844 | A1 | 10/2005 | Ivanov |
| 2005/0262434 | A1 | 11/2005 | Soderberg et al. |
| 2005/0268115 | A1 | 12/2005 | Barde et al. |
| 2006/0155725 | A1 | 7/2006 | Foster et al. |
| 2007/0016897 | A1 | 1/2007 | Todd |
| 2007/0100866 | A1 | 5/2007 | Binding et al. |
| 2007/0220268 | A1 | 9/2007 | Krishnaprasad et al. |
| 2007/0220604 | A1 | 9/2007 | Long |
| 2008/0046418 | A1 | 2/2008 | Johnston et al. |
| 2008/0235258 | A1 | 9/2008 | Chung et al. |
| 2012/0210396 | A1 | 8/2012 | Chung et al. |

OTHER PUBLICATIONS

Abu-Ghazaleh et al, "Differential Deserialization for Optimized SOAP Performance," ACM, IEEE SC 2005 Conference (SC '05), Seattle, Washington, Nov. 12-18, 2005, 11 pages.

Christensen et al., "Web Services Description Language (WSDL) 1.1," W3C Note, http://www.w3org/TR/wsdl, Mar. 15, 2001, 31 pages.

Exclusive XML Canonicalization Version 1.0, W3C Recommendation Jul. 18, 2002, http://www.w3.org/TR/xml-exc-c14n/, Jul. 18, 2002, 11 pages.

Liu et al., "Performance of Web Services Security," Technical Report 2004, retrieved from http://grids.ucs.indiana.edu/ptliupages/publications/WSSPerf.pdf on May 11, 2012, 8 pages.

Makino et al., "Improving WS-Security Performance with a Template-Based Approach," ICWS '05 Proceedings of the IEEE International Conference on Web Services, Industry Session, Jul. 2005, pp. 1-8.

Simple Object Access Protocol, "SOAP Version 1.2 Part 1: Messaging Framework (Second Edition)," W3C Recommendation, http://www.w3.org.TR/soap12-part1, Apr. 27, 2007, 53 pages.

Takase et al., "An Adaptive, Fast, and Safe XML Parser Based on Byte Sequences Memorization," International World Wide Web Conference Committee (IW3C2), Chiba, Japan, May 10-14, 2005, pp. 692-701.

Takeuchi et al., "A Differential-Analysis Approach for Improving SOAP Processing Performance," The 2005 IEEE International Conference on e-Technology, e-Commerce and e-Service (EEE '05), Hong Kong, China, Mar. 29-Apr. 1, 2005, pp. 472-479.

Teraguchi et al., "Optimized Web Services Security Performance with Differential Parsing," ICSOC'06 Proceedings of the 4th international conference on Service-Oriented Computing, Chicago, Illinois, Dec. 4-7, 2006, pp. 1-12.

"Web Services Security: SOAP Message Security 1.1 (WS-Security 2004)," Oasis Standard Specification, http://www.oasis-open.org/committees/download.php/16790/wss-v1.1-spec-os-SOAPMessageSecurity.pdf, Feb. 1, 2006, 76 pages.

"XML-Signature XPath Filter 2.0," W3C Recommendation Nov. 8, 2002, http://www.w3.org/TR/xmldsig-filter2/ on Nov. 8, 2002, 10 pages.

Office Action, dated Mar. 31, 2011, regarding U.S. Appl. No. 11/690,434, 22 pages.

Final Office Action, dated Sep. 12, 2012, regarding U.S. Appl. No. 11/690,434, 21 pages.

Office Action, dated Mar. 5, 2013, regarding U.S. Appl. No. 13/456,097, 19 pages.

Final Office Action, dated Sep. 13, 2013, regarding U.S. Appl. No. 13/456,097, 14 pages.

Office Action, dated Jan. 31, 2014, regarding U.S. Appl. No. 13/456,097, 14 pages.

Final Office Action, dated May 13, 2014, regarding U.S. Appl. No. 13/456,097, 13 pages.

* cited by examiner

FIG. 4

```
<S:Envelope xmlns:S="http://www.w3.org/2001/12/soap-envelope" .....>
  <S:Header>
    <wsse:Security>  ~404
      <wsse:BinarySecurityToken ValueType="wsse:X509v3"  .  vsu:Id="X509Token">
        MIIEzCCA9CgAwIBAgIQEmtJZc0rqrKh5i...                        IDENTIFIER
      </wsse:BinarySecurityToken>
      <ds:Signature>  ~412
        <ds:SignedInfo>
          <dsCanonicalizationMethod Algorithm= "http://www.w3.org/2001/10/xml-exc-c14n#"/>
          <ds:SignatureMethod Algorithm= "http://www.w3.org/2000/09/xmldsig#rsa-sha1"/>
          <ds:Reference URL="#myBody">               REFERENCE
            <ds:Transforms>
              <ds:Transform Algorithm="http://www.w3.org/2001/10/xml-exc-c14n#"/>
            </ds:Transforms>
            <ds:DigestMethod Algorithm="http://www.w3.org/2000/09/xmldsig#sha1"/>
            <ds:DigestValue>EULddytSo1...</ds:DigestValue>  ~418
          </ds:Reference>                   DIGEST VALUE
        </ds:SignedInfo>
        <ds:SignatureValue>BL8jdfToEb1/vXcMZNNiPOV....</ds:SignatureValue>  ~420
        <ds:KeyInfo>                                 SIGNATURE VALUE
          <wsse:SecurityTokenReference>
            <wsse:Reference URI="#X509Token"/>         REFERENCE
          </wsse:SecurityTokenReference>
        </dsKeyInfo>
      </ds:Signature>
    </wsse:Security>                    IDENTIFIER
  </S:Header>
  <S:Body wsu:Id="myBody">
    <tru:StockSymbol xmlns:tru="http://www.fabrikam123.com/payloads">
      QQQ</tru:StockSymbol>
  </S:Body>
</S:Envelope>
```

400

X.509 CERTIFICATE TOKEN 408

SIGNATURE 410

```
<S:Envelope xmlns:S="http://www.w3.org/2001/12/soap-envelope" ....>
  <S:Header>
    <wsse:Security>  ~504
      <wsse:BinarySecurityToken ValueType="wsse:X509v3" .....wsu:Id=" ">
      </wsse:BinarySecurityToken>                              509
      <ds:Signature>  ~512                                511
        <ds:SignedInfo>
          <dsCanonicalizationMethod Algorithm="http://www.w3.org/2001/10/xml-exc-c14n#"/>
          <ds:SignatureMethod Algorithm="http://www.w3.org/2000/09/xmldsig#rsa-sha1"/>
          <ds:Reference URI=" "> ~517
            <ds:Transforms>
              <ds:Transform Algorithm="http://www.w3.org/2001/10/xml-exc-c14n#"/>
            </ds:Transforms>
            <ds:DigestMathod Algorithm="http://www.w3.org/2000/09/xmldsig#sha1"/>
            <ds:DigestValue>  ~518
            </ds:DigestValue>
                  519
          </ds:Reference>
        </ds:SignedInfo>
        <ds:SignatureValue>  ~520
        </ds:SignatureValue>
        <ds:KeyInfo>                        521
          <wsse:SecurityTokenReference>
            <wsse:Reference URI=" "/>
          </wsse:SecurityTokenReference>
        </dsKeyInfo>
      </ds:Signature>  ~514
    </wsse:Security>  ~506
  </S:Header>
  <S:Body wsu:Id=" ">
    <tru:StockSymbol xmlns:tru="http://www.fabrikam123.com/payloads">
    </tru:StockSymbol>
  </S:Body>
</S:Envelope>
```

500

502, 508, 510, 516

PROCESSING EXTENSIBLE MARKUP LANGUAGE SECURITY MESSAGES USING DELTA PARSING TECHNOLOGY

CROSS-REFERENCE TO RELATED APPLICATION

This application is a divisional of U.S. patent application Ser. No. 13/456,097, filed Apr. 25, 2012, which is a divisional of U.S. patent application Ser. No. 11/690,434, filed Mar. 23, 2007. The contents of both aforementioned applications are incorporated herein by reference.

BACKGROUND OF THE INVENTION

1. Field of the Invention

The present invention relates generally to a data processing system and in particular to a method and apparatus for web services. More particularly, the present invention relates to a computer implemented method, apparatus, and computer usable program code for processing of extensible markup language (XML) security messages using delta parsing technology with a lightweight data model.

2. Description of the Related Art

A web service is a collection of protocols and standards for enabling an application to interact and exchange data with one or more other applications over the Internet. An application that is available over the Internet may be referred to as a web application or a web service application. Web services enable applications on different hardware, software, databases, or network platforms to interact with each other over the Internet.

Web services provide self-contained, modular, platform-independent applications. Web service applications are not limited to any one operating system platform or programming language for applications to communicate and exchange data. For example, encoding web services messages in extensible markup language enables an application on a computer running a Unix® operating system to interact with an application associated with a computer running a Windows® operating system. Likewise, an application written in Java® can interact with an application written in a different programming language, such as practical extraction and report language. Thus, a web service is like an application programming interface that allows a client to execute an application on a remote computing device as if the application were present on the client's own system.

Web services may be implemented using service oriented architecture in which the basic unit of communication and data exchange between applications is a message. Web services message-level communications between applications are generally performed in extensible markup language format. Web services exchange extensible markup language documents and messages over the Internet using standards such as transmission control protocol/Internet protocol, hypertext transfer protocol, simple object access protocol, web service definition language, and other standards and protocol layers for exchanging data over the Internet.

Web services enable business applications to be shared, combined, and used by heterogeneous computing devices within a business or enterprise. Web services also allow those business applications to be shared with customers, suppliers, vendors, and business partners. Due to the varied and widespread uses of web services, security of web services messages is important to ensure trust and privacy for users, as well as to avoid malicious and intentional changes of web services messages, man-in-the-middle attacks, and repudiations by senders.

Web Services Security defines data structures describing digital signatures, encryption, and other security devices that can be implemented on top of a simple object access protocol message to secure message data. When Web Services Security is applied to a Web Services message, the message may be referred to as a security message. Simple object access protocol is the basic messaging protocol for exchanging extensible markup language messages, such as security messages. The simple object access protocol may be thought of as an envelope that encloses an extensible markup language message. Web Services Security provides enhancements to simple object access protocol messaging to provide increased security of message data exchanged by web services. Many of the security features and protocols used in a security message may be found in the simple object access protocol envelope associated with the message.

However, Web Services Security processing typically requires that the entire content of an extensible markup language security message be parsed and stored in memory as a tree-based data model, such as document object model. Document object model tree-type data models can result in considerable overhead for creating the data model, as well as for traversing the possibly extensive nodes and branches in the data model to access needed data values. Thus, currently available Web Services Security message processing may result in decreased performance due to the overhead associated with processing the extensible markup language security message in addition to the overhead associated with the verbosity of extensible markup language messages.

SUMMARY OF THE INVENTION

The illustrative embodiments provide a computer implemented method, apparatus, and computer usable program code for processing markup language security messages. In one embodiment, a template corresponding to a markup language security message is identified. The markup language security message is parsed for variable values using the template. The template is stored in a cache. The cache can store multiple templates using transitions. Each transition in the cache is associated with a portion of the markup language security message. A transition sequence is generated that represents the entire markup language security message. A lightweight data model of the markup language security message is populated using the transition sequence. Variable values in the lightweight data model are populated using an original data encoding for the markup language security message without any data conversion. The lightweight data model includes nodes for the variable values and a set of selected constant values. The markup language security message may be an extensible markup language security message.

The lightweight data model may be generated using the template. A set of unneeded constant values from a plurality of constant values in the template may be identified. Constant values in the template that are required to process the markup language security message are selected to form the set of selected constant values. The lightweight data model includes a node for each variable value in the variable values in the security message and a node for each constant value in the set of selected constant values. A node for a value in the set of unneeded constant values is absent from the lightweight data model.

Thus, information that is not required for processing the security message is absent from the lightweight data model.

Processing security messages may include generating a digital signature, verifying a digital signature, encrypting data, or decrypting data. The lightweight data model may be used to add a digital signature to a portion of the markup language security message, verify a digital signature in the markup language security message, encrypt a portion of the markup language security message, or decrypt an encrypted portion of the markup language security message.

The lightweight data model may be stored in a cache. The cache may be an automaton.

In response to receiving a second markup language security message, a determination may be made as to whether a result of a canonicalization of a markup language security message stored in a canonicalization automaton is a match with the second markup language security message. In response to identifying a match between a result of canonicalization stored in the canonicalization automaton and the second markup language security message, a canonicalization of the second markup language security message may be skipped.

In response to receiving a second markup language security message, a determination may be made as to whether a result of a transformation of a previous markup language security message stored in the transformation automaton is a match with the second markup language security message. In response to identifying a match between a result of transformation of a previous markup language security message stored in the canonicalization automaton and the second markup language security message, a transformation of the second markup language security message may be skipped.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating a web services security message in accordance with an illustrative embodiment;

FIG. 5 is a diagram illustrating a secured message template in accordance with an illustrative embodiment;

DETAILED DESCRIPTION OF THE PREFERRED EMBODIMENT

Figure 1:
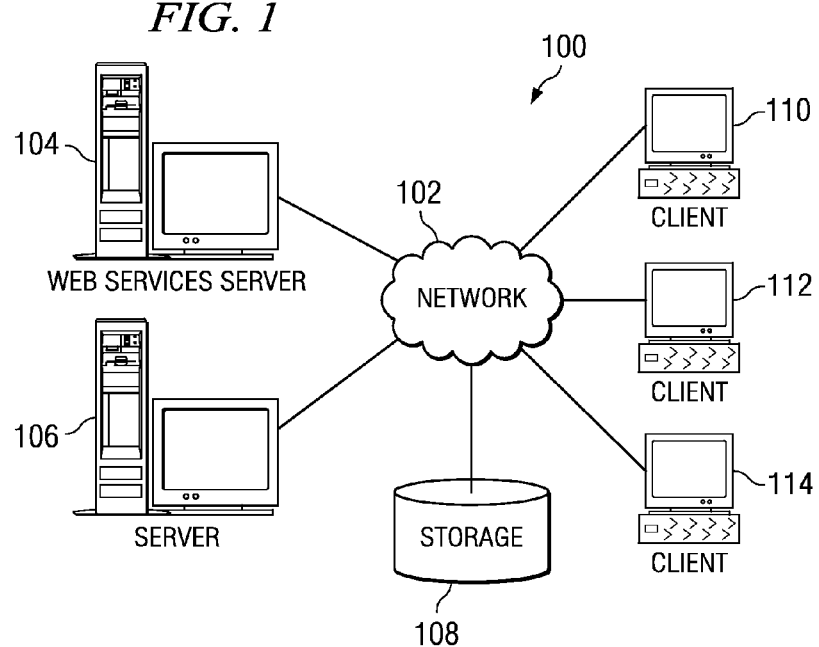
FIG. 1 is a pictorial representation of a network of data processing systems in which illustrative embodiments may be implemented.
Figure 2:
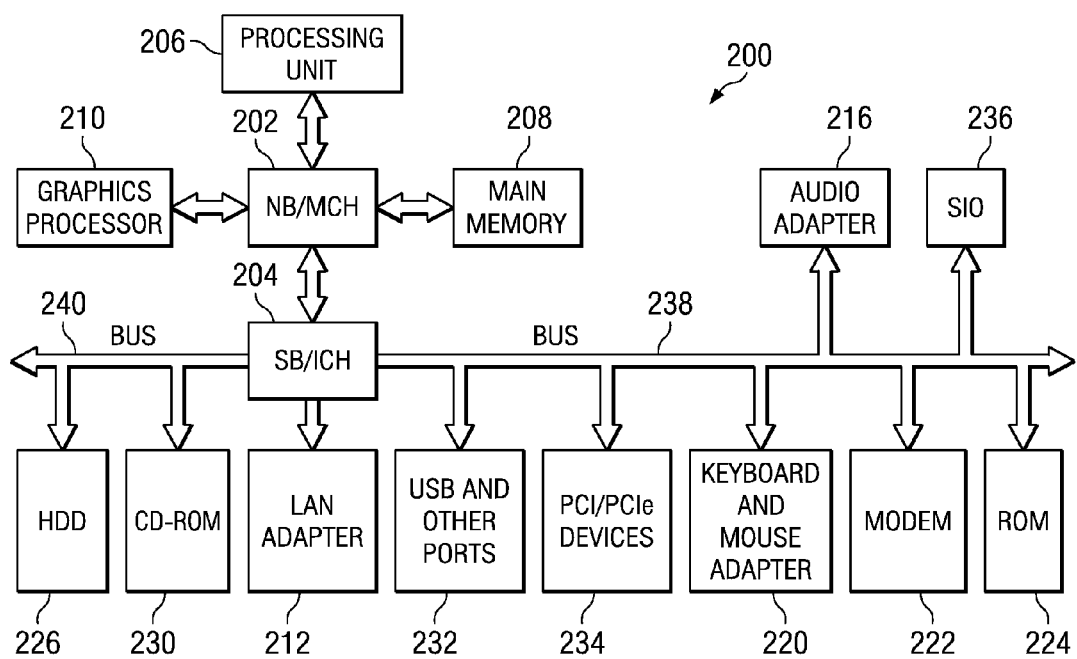
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, web services server 104 and server 106 connect to network 102 along with storage unit 108. Web services server 104 is a server providing access to one or more applications to users on network 102 as a web service. Web services server 104 is any type of computing device employing a web services protocol stack to enable users at a remote computing device to access and execute applications on web services server 104 by means of network 102.

Server 106 is any type of server, including but not limited to, an application server, a web services server, or any other type of server. In addition, server 106 may also request access to and/or execution of one or more web services applications available on web services server 104. Likewise, web services server 104 may also request access to and/or execution of one or more web services applications available on server 106.

Clients 110, 112, and 114 connect to network 102 and request to access and/or execute applications on web services server 104. These clients 110, 112, and 114 may be, for example, personal computers or network computers. In the depicted example, web services server 104 provides data, such as boot files, operating system images, and applications to clients 110, 112, and 114. Clients 110, 112, and 114 are clients to web services server 104 in this example. Network data processing system 100 may include additional servers, clients, applications, and other devices not shown.

In the depicted example, network data processing system 100 is the Internet with network 102 representing a worldwide collection of networks and gateways that use the Transmission Control Protocol/Internet Protocol (TCP/IP) suite of protocols and web services protocol stack to communicate with other computing devices and applications connected to network 102. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wireless network, a wide area network (WAN), an Ethernet, or the Internet. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as web services server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments recognize that existing extensible markup language messaging security uses a structured tree data model similar to document object model (DOM) to process extensible markup language security messages. The structured tree data model may result in performance bottlenecks due to document object model tree construction, unnecessary data handling, and document object model tree traversal.

The illustrative embodiments provide a computer implemented method, apparatus, and computer usable program code for processing markup language security messages. In one embodiment, a template corresponding to a markup language security message is identified. The template contains constant values and variable values. Constant values are values that tend to remain constant or the same in multiple different security messages. Variable values are values that tend to vary or change in different security messages. In other words, in security messages conforming to a common structure or type, the variable values tend to be different in different security messages while constant values tend to remain the same.

The markup language security message is parsed for variable values using the template. The template may be stored in a cache. The cache can store a transition. The transition in the cache is associated with a portion of the markup language security message. A transition sequence is generated that represents the entire markup language security message.

The security message is parsed for variable values because these values are generally different in different security messages. Therefore, the variable values in the template cannot be used in place of the actual variable values in the security message for generating a transition sequence. However, the constant values in the security message are the same as the constant values in the template. Therefore, the security message does not need to be parsed for the constant values. Instead, the constant values from the template are used for generating the transition sequence.

The transition sequence is an intermediate sequence representing the security message. Each transition in the transition sequence is associated with a portion of the markup language security message. The transition sequence is used to populate a lightweight data model corresponding to the markup language security message. The lightweight data model is a Web Services Security data model that stores only the collection of information required for Web Services Processing. Processing security messages may include generating a digital signature, verifying a digital signature, encrypting data, or decrypting data. The lightweight data model may be used to add a digital signature to a portion of the extensible markup language message based on the lightweight data model, verify a digital signature in the markup language security message, encrypt a portion of the markup language security message, and decrypt an encrypted portion of the markup language security message.

Thus, information that is not required for processing the security message is absent from the lightweight data model. The data model is lightweight such that a user can develop an implementation of the data model so as to reduce unnecessary memory usage and performance overhead when the data model is accessed. In other words, because the data model does not include data values that are not used during processing of security messages, it is easier and more efficient for a processor to traverse or retrieve needed data from the data model during processing of the security message. Thus, the illustrative embodiments provide an improved logical structure for a data model that provides increased efficiency and reduces performance overhead during processing of security messages.

In one embodiment, variable values in the lightweight data model are populated using an original data encoding for the markup language security message without any data conversion. The lightweight data model includes nodes for the variable values and a set of selected constant values. The set of selected constant values contains one or more constant values in these examples.

In one embodiment, the lightweight data model is generated using the template. A set of unneeded constant values from a plurality of constant values in the template may be identified. Constant values in the template that are required to process the markup language security message are selected to form the set of selected constant values. The lightweight data model includes a node for each variable value in the variable values in the security message and a node for each constant value in the set of selected constant values. A node for a value in the set of unneeded constant values is absent from the lightweight data model.

The lightweight data model may be stored in a cache. The cache may be an automaton. The automaton may store a template for a security message, transitions corresponding to the security message, and/or a lightweight data model corresponding to the security message. The lightweight data model may be mapped to the transitions. The automaton may store the entire lightweight data model or only a portion of the lightweight data model.

As used herein, an automaton is a finite state machine. An automaton may consist of two parts, a state and a transition. A state is a condition with regard to structure, form, phase, or status. The state outputs stored data, such as the current internal state of a parser at that moment and/or a state of a portion of a lightweight data model. A transition is a change or movement from one state to another. A transition has a constant value or a variable generated from an input security message as a transition condition. In other words, an automaton may be used to model and/or store states of a system and transitions between those states.

In response to receiving a second markup language security message, a determination may be made as to whether a result of a canonicalization of a markup language security message stored in a canonicalization automaton is a match with the second markup language security message. Canonicalization is the process of converting data that may be represented in multiple different formats into a standard format. Canonicalization may be necessary because markup languages, such as extensible markup language, may be written in varying equivalent formats. For example, the use of white space inside extensible markup language elements is not significant. Therefore, <Security> is syntactically equivalent to <Security>. Canonicalization is a transformation of extensible markup language in one format to extensible markup language in another equivalent format. Therefore, to ensure that logically identical security message elements are treated the same despite variations in the element syntax, canonicalization may be necessary to transform security messages into a standard format.

In response to identifying a match between a result of canonicalization stored in the canonicalization automaton and the second markup language security message, a canonicalization of the second markup language security message may be skipped.

In response to receiving a second markup language security message, a determination may be made as to whether a result of a transformation of a previous markup language security message stored in the transformation automaton is a match with the second markup language security message. In response to identifying a match between a result of transformation of a previous markup language security message stored in the canonicalization automaton and the second markup language security message, a transformation of the second markup language security message may be skipped.

Thus, the illustrative embodiments provide a processing model of extensible markup language messaging security to improve message processing performance. A lightweight data model is used instead of the currently used structured tree or document object model type data structure to reduce performance overhead for accessing the data model. Delta parsing is also used to avoid unnecessary data handling. For example, unnecessary data handling may occur during the canonicalization process and/or during transformation.

Canonicalization refers to the process of converting data into a standard format for processing of the data. Transformation refers to the process of converting data from a source format into a destination format.

The illustrative embodiments herein are described in the context of extensible markup language security messaging associated with a Web Service. However, the illustrative embodiments are not limited to Web Services Security messaging. The lightweight data model coupled with delta parsing technology of the illustrative embodiments may be implemented to process any type of markup language message containing a security element.

Figure 3:
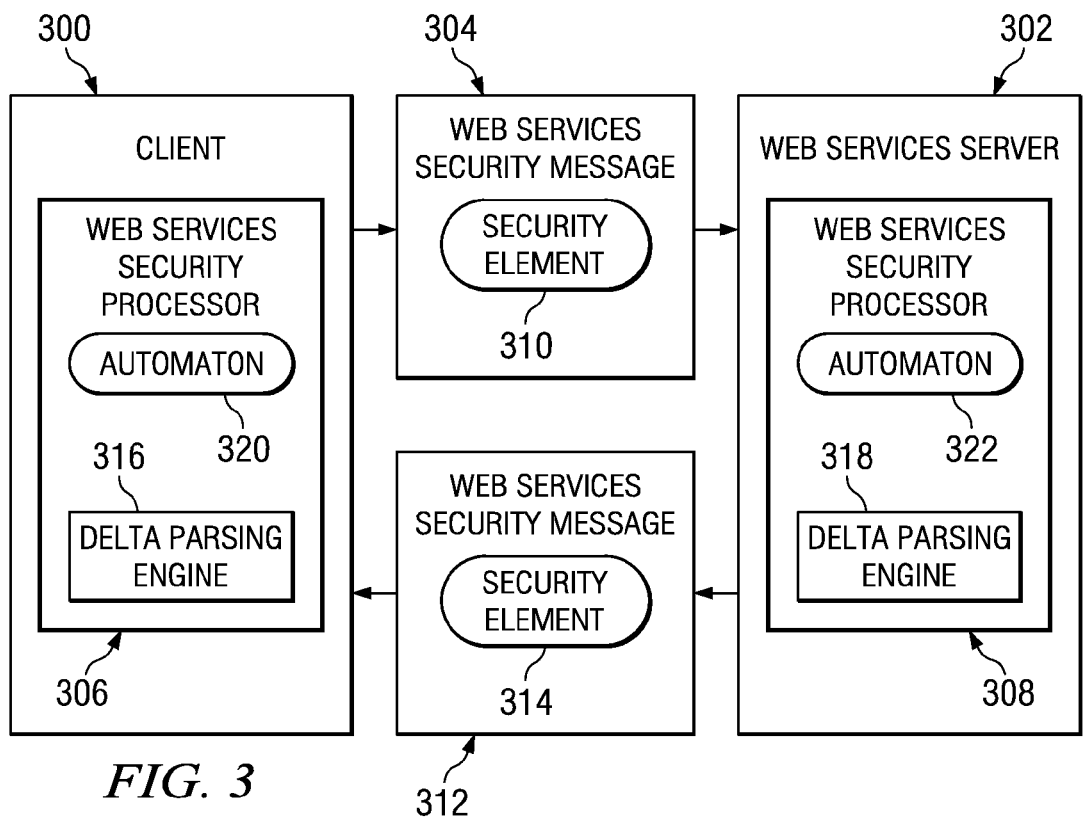
FIG. 3 is a block diagram illustrating a dataflow when a client requests access to web services in accordance with an illustrative embodiment.

FIG. 3 is a block diagram illustrating a dataflow when a client requests access to web services in accordance with an illustrative embodiment. Client 300 is a computing device requesting to access and/or execute a web services application provided on web services server 302. Client 300 is any type of known or available general computing device. Client 300 may be implemented using any type of computing device, such as a personal computer, laptop, personal digital assistant, or any other computing device depicted in FIGS. 1 and 2. In this example, client 300 may be client 110 in FIG. 1.

Web services server 302 is a computing device providing access to a web services application located on or locally to web services server 302. Web services server 302 is any type of known or available general computing device. Web services server 302 may be implemented using any type of computing device, such as a personal computer, laptop, personal digital assistant, or any other computing device depicted in FIGS. 1 and 2. In this example, web services server 302 may be web services server 104 in FIG. 1.

Client 300 is connected to web services server 302 by a network connection, such as network 102 in FIG. 1. In this example, the network is the Internet. Client 300 requests to access and/or execute a web services application associated with web services server 302 by sending a web services request to web services server 302. In order to secure the web services request, the request is generated as a web services security (WS-Security) message, such as Web Services Security message 304 with a security element included in the simple object access protocol envelope of Web Services Security message 304.

Web Services Security processor 306 on client 300 and Web Services Security processor 308 on web services server 302 are Web Services Security processors that utilize delta parsing technology. Web Services Security processor 306 encrypts message data and generates digital signatures to create security element 310 in outgoing Web Services Security messages, such as Web Services Security message 304.

Security element 310 is a portion of an extensible markup language message delimited by a pair of security element tags. Security element 310 may include a digital signature, encryption, and other nested security elements. Web Services Security processor 306 also processes incoming Web Services Security message 312 to decrypt message data and verify digital signatures in security element 314. Web Services Security processor 306 includes delta parsing engine 316 for parsing incoming Web Services Security messages. Likewise, Web Services Security processor 308 includes delta parsing engine 318 for parsing incoming security messages.

Delta parsing engine 316 is software for parsing an extensible markup language message using a template to identify variable values. In Web Services Security messaging, extensible markup language messages frequently contain identical portions of the message with some values that vary or change from one message to the next. The values that tend to change from one extensible markup language message to the next are referred to as variable values. The values that tend to remain constant in the extensible markup language message format used for multiple extensible markup language messages are referred to as constant values.

Delta parsing engine 316 and/or delta parsing engine 318 parses an extensible markup language message for variable values using a message template corresponding to the received extensible markup language message. The templates used by delta parsing engine 316 are stored in automaton 320. In other words, automaton 320 is a cache for storing one or more cached extensible markup language message templates. Likewise, automaton 322 on web services server 302 also stores cached extensible markup language message templates for Web Services Security messages.

Thus, in accordance with this embodiment, Web Services Security processor 306 on client 300 generates outgoing Web Services Security message 304 to request access to an application on web services server 302. Web Services Security processor 308 on web services server 302 processes Web Services Security message 304 by calling delta parsing engine 318.

To parse the message, delta parsing engine 318 identifies a matching template cached in automaton 322. A matching template is an extensible markup language message template that corresponds to the message structure of the entire extensible markup language message or a portion of the extensible markup language message. The template includes constant values and indicators or variables for non-constant, variable values.

Delta parsing engine 318 may also retrieve a cached lightweight data model corresponding to Web Services Security message 304 and a transition sequence that represents the entire Web Services Security message 304.

Each transition in a transition sequence is associated with a portion or snippet of Web Services Security message 304. In other words, each transition could represent an element, an element tag, a nested sub-element, a nested sub-element tag, a content value, a variable value, a constant value, and/or an attribute. In other words, if a template in automaton 322 that matches the format or structure of Web Services Security message 304 is identified in cache, then a transition sequence and data model corresponding to the identified template may also be stored in cache.

Rather than parsing all of Web Services Security message 304, delta parsing engine 318 will use the cached template to parse Web Services Security message 304 only for variable values. Using the template saves processor cycles and improves efficiency because Web Services Security message 304 is only parsed for differences between the cached template and Web Services Security message 304. The differences between the template and Web Services Security message 304 are identified by byte matching the variable values in the identified template with the byte arrays corresponding to the same variable value arrays in Web Services Security message 304. Byte matching refers to a byte-by-byte comparison of bytes in an input byte array with the bytes array in a template.

The difference between the template and Web Services Security message 304 is the variable values. These parsed variable values are plugged into the cached transition sequence corresponding to the identified template saved in cache. If a transition sequence corresponding to the message is not available, Web Services Security processor 308 generates a transition sequence based on the parsed extensible markup language message data and stores a newly generated extensible markup language message template and a data model corresponding to the template in automaton 322 for use in processing future extensible markup language messages received from a client, such as client 300. Web services security processor 308 uses the transition sequence to generate the lightweight data model for Web Services Security message 304.

Web Services Security processor 308 maps the variable values and a set of selected constant values in the transition sequence to the cached data model to generate the lightweight data model. Web Services Security processor 308 does not map all of the constant values to the data model because the data model is a lightweight data model that only includes variable values and selected constant values that are needed to process Web Services Security message 304. Any constant values that are not required to process Web Services Security message 304 are not included in the lightweight data model of the illustrative embodiments.

The lightweight data model includes nodes for the variable values and a set of selected constant values. Web Services Security processor 308 traverses the lightweight data model to access and decrypt message data in Web Services Security message 304.

If web services server 302 decides to send an outgoing Web Services Security message 312 response to client 300, Web Services Security processor 308 generates Web Services Security message 312, including security element 314, based on a lightweight security model generated by Web Services Security processor 308. When client 300 receives Web Services Security message 312, Web Services Security processor 306 parses the message, generates a transition sequence, and populates a lightweight data model to process data from Web Services Security message 312.

In accordance with an illustrative embodiment, if a template matching an extensible markup language message or a portion of an extensible markup language message is not found in automaton 320, Web Services Security processor 306 creates a template for the extensible markup language message by parsing the entire extensible markup language message. Web Services Security processor 306 stores the newly generated extensible markup language message template in automaton 320 for use in processing future extensible markup language messages received from servers, such as web services server 302.

Web Services Security is an emerging mechanism to add security features to extensible markup language-based simple object access protocol messages. Simple object access protocol is the primary data transfer protocol used by web services for the transmission of web services messages. Application data is embedded in a body element of a simple object access protocol message. Security information is embedded in a header element of the simple object access protocol message.

FIG. 4 is a diagram illustrating a web services security message in accordance with an illustrative embodiment. Security message 400 is an extensible markup language simple object access protocol message used to exchange data between web services applications on a web services server and applications on a client computing device. In this example, security message 400 takes the form of Web Services Security message 304 in FIG. 3.

Security message 400 includes security element 402 embedded in a header element of the simple object access protocol envelope. Security element 402 is delimited by security tags 404 and 406. Security element 402 includes security token element 408 and signature element 410. Signature element 410 is an extensible markup language digital signature included in the simple object access protocol message delimited by tags 412 and 414.

Reference element 416 is a value for a uniform resource identifier reference value. Reference element 416 may be used to enable interaction between resources over a network.

Digest element 418 is a variable value that is a digest of a portion of an extensible markup language message. A digest is a hash value of a hash function used to verify the integrity of message data.

Signature value 420 is a variable value that may be used to decrypt a digital signature embedded in or associated with an extensible markup language message. A digital signature may include a cryptographic signature with mechanisms such as message authentication codes and integrity hashes used to verify the integrity of signature element 410.

In most cases, web services messages exchanged between applications are sufficiently similar that portions of the messages are virtually identical. For example, if a web service client sends extensible markup language messages that are secured by Web Services Security to the same web service repeatedly and/or a web service receives messages that are secured by Web Services Security, the structure of the simple object access protocol messages will be exactly the same with the exception of some variable values, such as identifier values, reference URI values, digest values, signature values, and application data. In such cases, an extensible markup language message template can be generated based on the constant parts of the message.

FIG. 5 is a diagram illustrating a secured message template in accordance with an illustrative embodiment. Template 500 is a template of an extensible markup language message having a simple object access protocol header, such as security message 400 in FIG. 4. The simple object access protocol header includes at least one security element 502.

Template 500 includes constant values and variable values. In this example, variable values are indicated by an empty box or rectangular shape where a variable value should be provided or may be found. In this example, the template does not include a value for the variable because the value may vary in different extensible markup language messages. In other words, variable values cannot be predicted. Therefore, template 500 indicates variable values that may be parsed and/or identified in a given security message.

Template 500 is shown only for illustrative purposes and is not intended to suggest any structural, format, element, or value limitations for a template. Template 500 is merely one example of a possible format, structure, elements, attributes, and values that could be found in an extensible markup language message. In other words, possible extensible markup language message templates are not limited to the format, elements, and values shown in template 500. A template generated based on any extensible markup language message may be used in accordance with the illustrative embodiments.

In this illustrative example, template 500 includes security element 502, which is delimited by tags 504 and 506. Security element 502 includes security token element 508 and signature element 510. Security token element 508 includes variable values 509 and 511. The other values in security token element 508 are constant values that do not vary in disparate extensible markup language messages matching template 500.

In this example, signature element 510 is an extensible markup language digital signature included in the simple object access protocol message delimited by tags 512 and 514. Reference element 516 contains variable value 517. Digest element 518 includes variable value 519. Signature value 520 includes variable value 521.

Template 500 may be stored in a cache or other data storage. In this example, template 500 is located in an automaton, such as automaton 320 in FIG. 3. When an extensible markup language message is received, the message is compared to one or more templates cached in the automaton. If the entire extensible markup language message or any portion of the extensible markup language message matches the constant portions of one or more templates in the cache, the matching of one or more templates may be used by the delta parsing engine, such as delta parsing engine 316 in FIG. 3, to parse the extensible markup language message for variable values. There is no need to parse the extensible markup language message for constant values because these values are already available in the template. In one embodiment, if a template matching or corresponding to a security message is not found, a new template is generated based on the security message. The newly generated template is stored in cache for use in processing future extensible markup language messages.

A delta parsing engine can use template 500 to parse an extensible markup language message for variable values by comparing the extensible markup language message to template 500. The constant portions of extensible markup language message template 500 will be identical in the extensible markup language message.

The delta parsing engine considers the extensible markup language message as a byte array. The delta parsing engine compares the extensible markup language message to template 500 and extracts the difference or variables by byte matching without regular extensible markup language parsing. Regular extensible markup language parsing would parse the entire extensible markup language message. Delta parsing only parses the extensible markup language message for differences between the extensible markup language message and extensible markup language message template 500. In this manner, the illustrative embodiments improve processing performance by using delta parsing based on extensible markup language template 500.

In one embodiment, canonicalization of the extensible markup language message is performed prior to the delta parsing engine comparing the extensible markup language message to extensible markup language message template 500. In another example, a canonicalization corresponding to extensible markup language message template 500 is stored in cache. This cached canonicalization is used to canonicalize the extensible markup language message rather than performing a new canonicalization process on the extensible markup language message.

Web Services Security processor populates a transition sequence with the parsed variable values identified by delta parsing the extensible markup language message using the identified template. In this manner, Web Services Security processor generates a transition sequence for the extensible markup language message. The transition sequence may be a transition sequence retrieved from cache or a transition sequence generated by the Web Services Security processor. The transition sequence contains a transition representing every value in the extensible markup language message represented by the transition sequence. In other words, the transition sequence represents the entire extensible markup language message.

Next, the Web Services Security processor maps a set of transitions from the transition sequence corresponding to the extensible markup language message to a lightweight data model. The lightweight data model is smaller or has fewer nodes than a traditional document object model type tree data structure. In other words, a traditional document object model type tree data structure would provide a node for every value in the entire extensible markup language message. However, this results in processing overhead due to data model generation and traversal to locate needed data values. Therefore, the lightweight data model excludes or does not provide nodes for values that are not necessary for processing a given extensible markup language message.

In this example, constant parts in the transition sequence are mapped to the lightweight data model only if the constant values are necessary for decrypting and accessing data in the extensible markup language security message. For example, a signature object for a digital signature element is necessary to verify a digital signature of a portion of an extensible markup language message. Therefore, the digital signature element will be mapped from the transition sequence to the lightweight data model, even though the digital signature element is constant in multiple different extensible markup language messages exchanged between one or more web clients and a web services server.

Figure 6A:
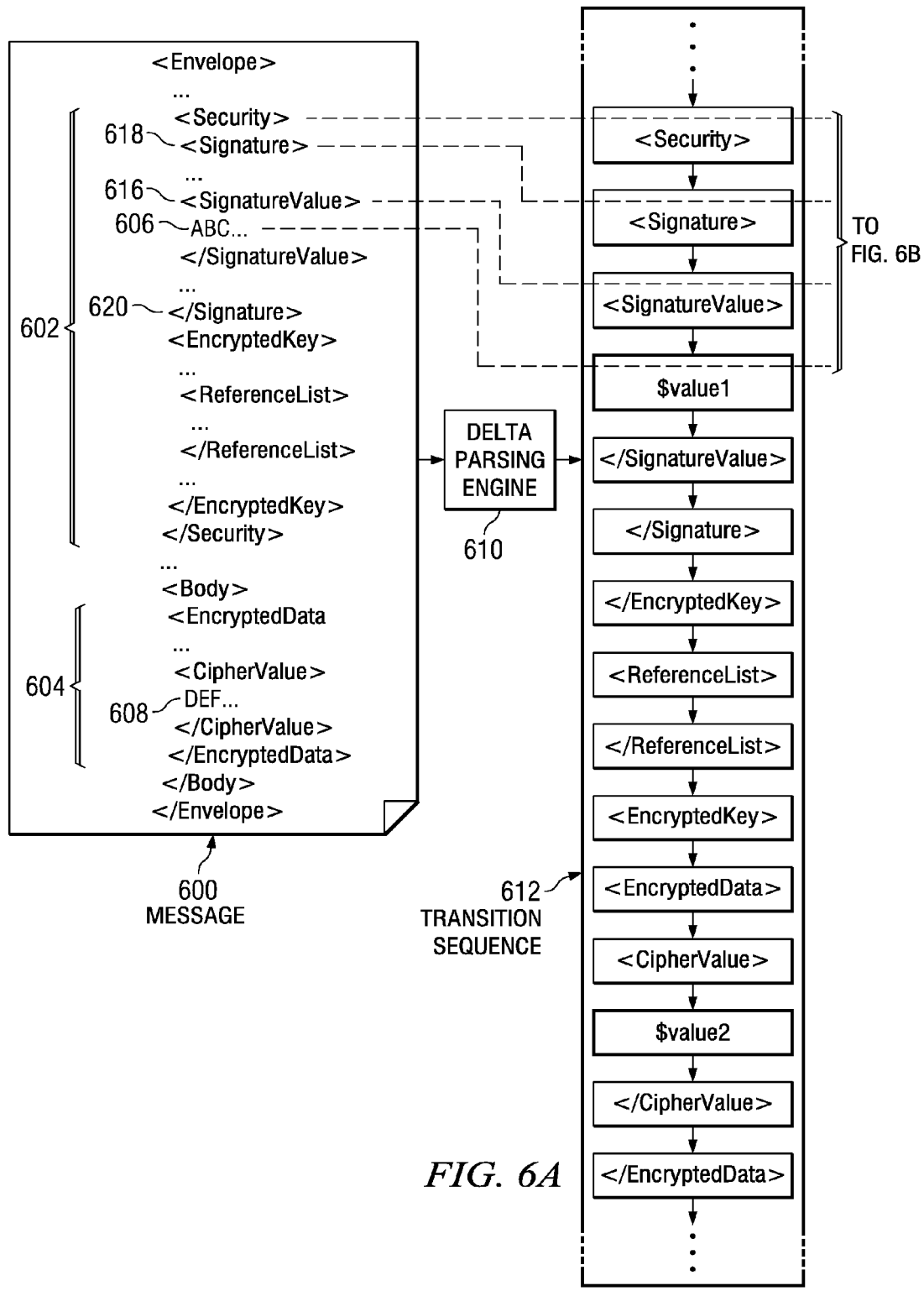
FIG. 6A is a diagram illustrating mapping data values from a transition sequence to a lightweight data model in accordance with an illustrative embodiment.

FIG. 6A is a diagram illustrating mapping data values from a transition sequence to a lightweight data model in accordance with an illustrative embodiment. Message 600 is an extensible markup language message including security element 602 and encrypted message data 604. In this example, message 600 is an extensible markup language message, such as extensible markup language message 400 in FIG. 4. Message 600 includes a set of variable values. In this example, the set of variable values includes, but is not limited to, signature value 606 and cipher value 608.

Delta parsing engine 610 is a software component in a Web Services Security processor for performing delta parsing of message 600 to identify variable values, such as signature value 606 and cipher value 608. Delta parsing engine 610 is a delta parsing engine, such as delta parsing engine 316 in FIG. 3. Delta parsing engine 610 performs byte matching between a template identified as corresponding to message 600 and message 600. If a template corresponding to all of message 600 or a portion of message 600 is not found, delta parsing engine 610 performs regular parsing of the entire message 600 or a portion of message 600 to create a new template. In other words, the illustrative embodiments allow complete parsing of a security message or only partial parsing of a portion of a security message to create a template and/or a lightweight data model corresponding to the entire security message or the portion of the security message. The new template is stored in an automaton for use in processing extensible markup language messages received in the future. The automaton may also be used to store transition sequences, lightweight data models, results of transitions, and/or results of canonicalization in addition to or instead of storing the template.

After delta parsing message 600 to identify the set of variable values, delta parsing engine 610 retrieves transition sequence 612 corresponding to the identified template from cache. If a transition sequence corresponding to the identified template is not available in cache, a transformation process is performed on message 600 to generate transition sequence 612. In this example, the newly generated transition sequence is also stored in an automaton for use in processing extensible markup language messages received in the future.

In this example, transition sequence 612 is available in cache. Therefore, delta parsing engine 610 populates transition sequence 612 with the set of variable values. It is not necessary to populate transition sequence 612 with constant values, because cached transition sequence 612 already includes all the constant values.

Figure 6B:
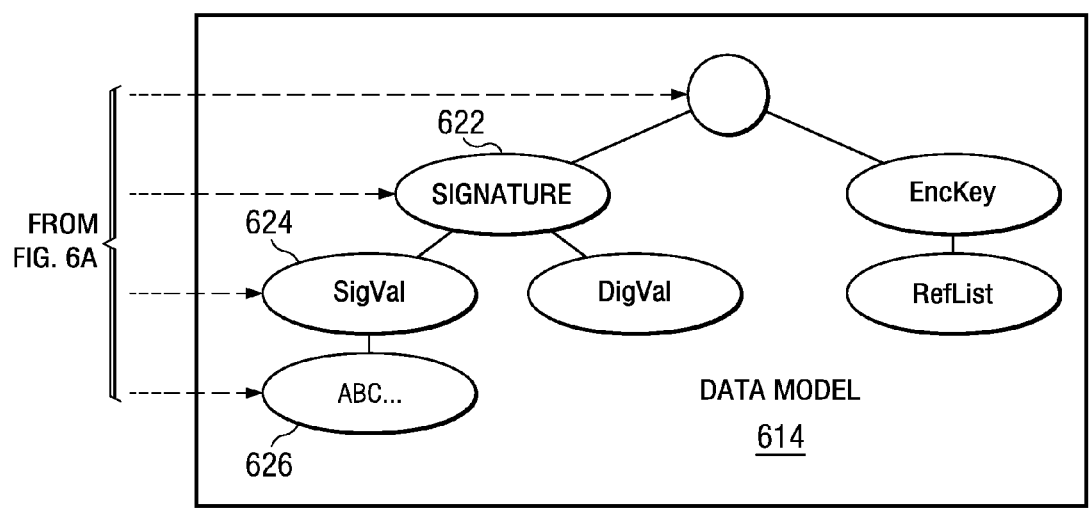
FIG. 6B is a diagram illustrating mapping data values from a transition sequence to a lightweight data model in accordance with an illustrative embodiment.

FIG. 6B is a diagram illustrating mapping data values from a transition sequence to a lightweight data model in accordance with an illustrative embodiment. Web Services Security processor maps all variable values from transition sequence 612 shown in FIG. 6A to data model 614. Data model 614 is a lightweight tree type data structure containing nodes representing all variable values in message 600 and a set of selected constant values from message 600. All constant values from message 600 are not mapped to data model 614 because all the constant values are not needed to decrypt and process message 600.

In this example, signature value 616 in message 600 shown in FIG. 6A is a selected constant value that is needed to process the digital signature embedded in the simple object access protocol envelope of message 600. Signature tags 618 and 620, as well as a constant value for signature value 616, in message 600 are mapped from transition sequence 612 to data model 614 shown in FIG. 6B. Signature tag 618 in message 600 is mapped to node 622 in data model 614. Likewise, signature value 616 is mapped to node 624. Nodes 622 and 624 are nodes for selected constant values. Node 626 is mapped to variable signature value 606. In other words, all the variable values and the set of selected constant values in transition sequence that are needed to process and verify message 600 are mapped to data model 614. However, constant values that are not needed for processing and verifying that message 600 are not mapped from transition sequence 612 to data model 614. In this manner, data retrieval and traversal of data model 614 requires fewer processor cycles and results in improved Web Services Security message processing performance because unnecessary data handling, message parsing, and transformations are avoided.

Figure 7:
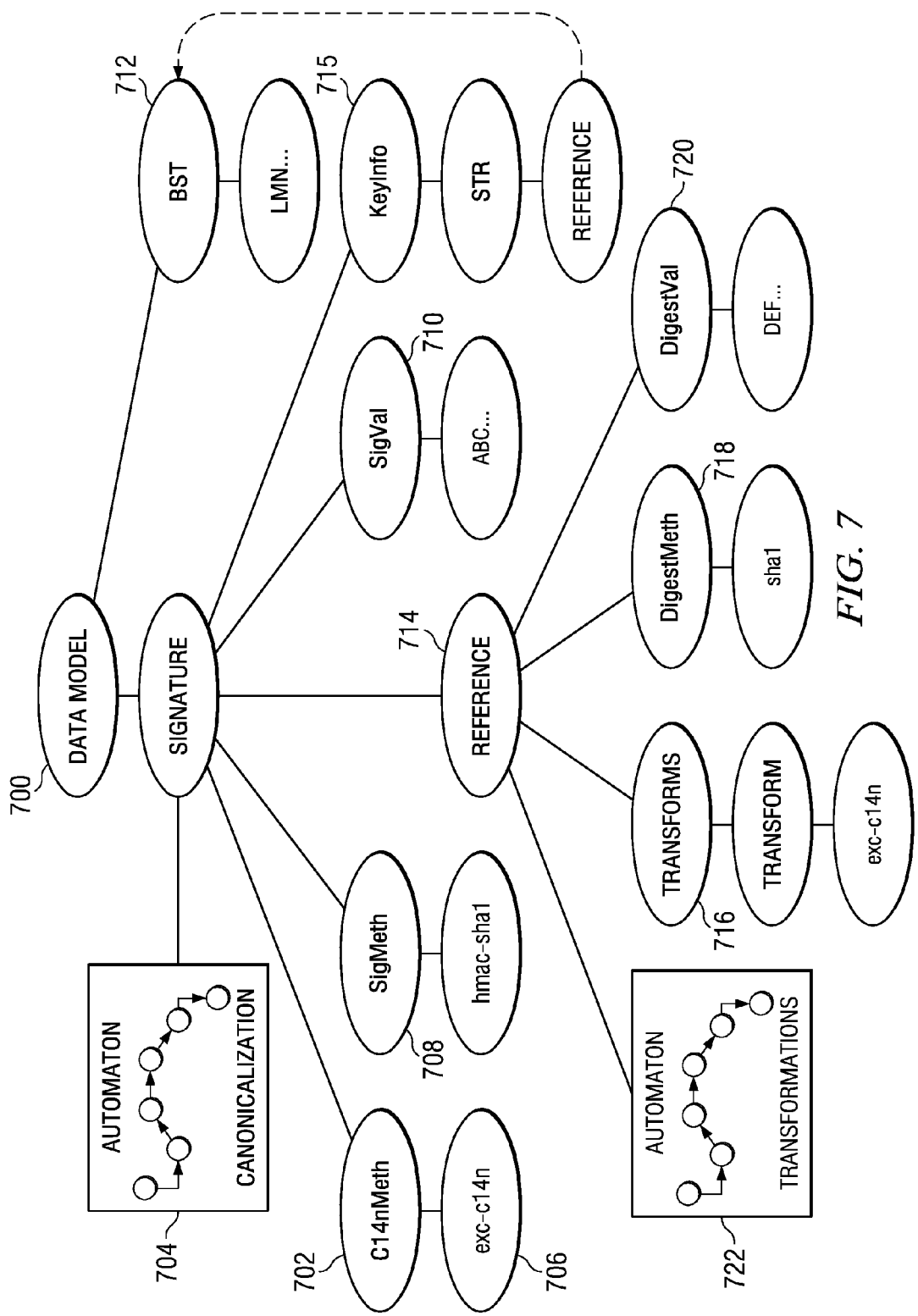
FIG. 7 is a diagram illustrating a logical structure of a lightweight data model for an extensible markup language digital signature in accordance with an illustrative embodiment.

FIG. 7 is a diagram illustrating a logical structure of a lightweight data model for an extensible markup language digital signature in accordance with an illustrative embodiment. Data model 700 is a lightweight data model corresponding to an extensible markup language message. Data model 700 may be data model 614 in FIG. 6.

Data model 700 holds the minimum information needed by the Web Services Security processor to process and add a digital signature to the extensible markup language message or verify a digital signature in the extensible markup language message. Web Services Security processor can traverse data model 700 more easily than a document object model type tree data structure holding all the values from the extensible markup language message.

Data model 700 includes canonicalization method 702 for canonicalizing the extensible markup language message. The actual value for the canonicalization method "exc-c14n" is mapped to node 706. Data model 700 also contains signature method 708, signature value 710, canonicalization automaton 704, binary security token (BST) value 712, and reference details 714. Key information 715 includes information required to resolve a key used for digitally signing. Reference details 714 include the reference to a portion of the message, information about transforms 716, digest method 718, digest value 720, and automaton used for transformations 722.

An automaton is a software component for storing one or more cached templates, performing transformations, performing canonicalization processes, and/or any other function associated with processing an extensible markup language message. In this example, canonicalization automaton 704 is an automaton for performing canonicalization operations. Transformation automaton 722 is an automaton for performing transformation operations.

Figure 8:
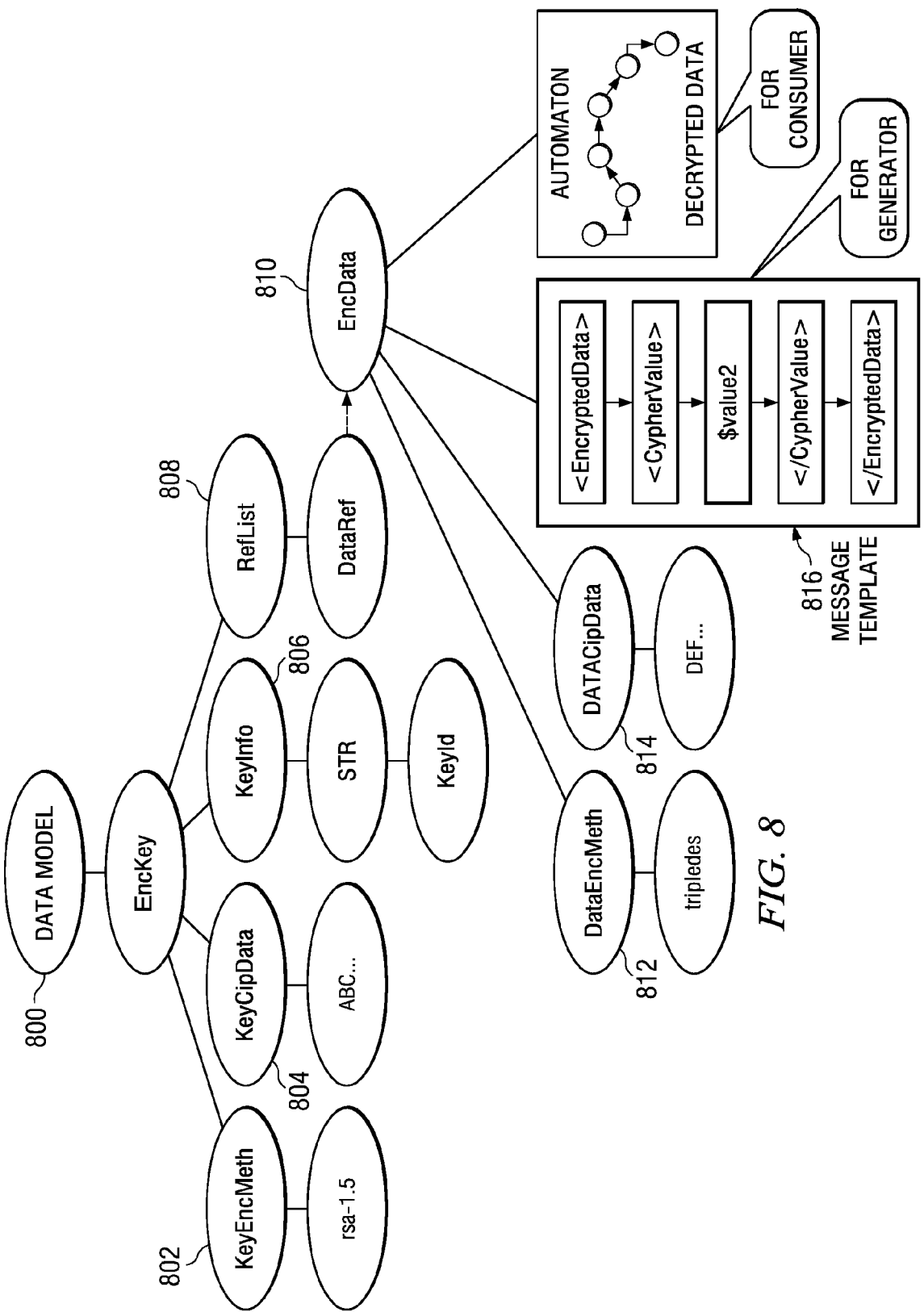
FIG. 8 is a diagram illustrating a logical structure of a lightweight data model for extensible markup language encryption in accordance with an illustrative embodiment.

FIG. 8 is a diagram illustrating a logical structure of a lightweight data model for extensible markup language encryption in accordance with an illustrative embodiment. Data model 800 is a data model of an encryption element in an extensible markup language message. In this example, data model 800 contains the minimum information required by Web Services Security processor for processing and encrypting a portion of the extensible markup language message or decrypting a portion of the extensible markup language message.

Data model 800 includes key encryption method 802, encrypted cipher data 804, key information 806, reference details 808, and encrypted data details 810. Encrypted cipher data 804 is encrypted data of the key used for data encryption. Key information 806 includes information required to resolve a key used for encrypting. Reference details 808 include the references to the encrypted data objects.

Encrypted data details 810 may include, but are not limited to, data encryption method 812, encrypted cipher data 814 of the original data in the message, and message template 816 used for message replacement in the generator side or automaton used for decrypted data matching in the consumer side. The generator side refers to the Web Services Processor on the computing device that generated the extensible markup language message mapped to data model 800. The consumer side refers to the Web Services Security processor on the computing device that received the extensible markup language message and is decrypting and/or processing the extensible markup language message to obtain message data.

Figure 9:
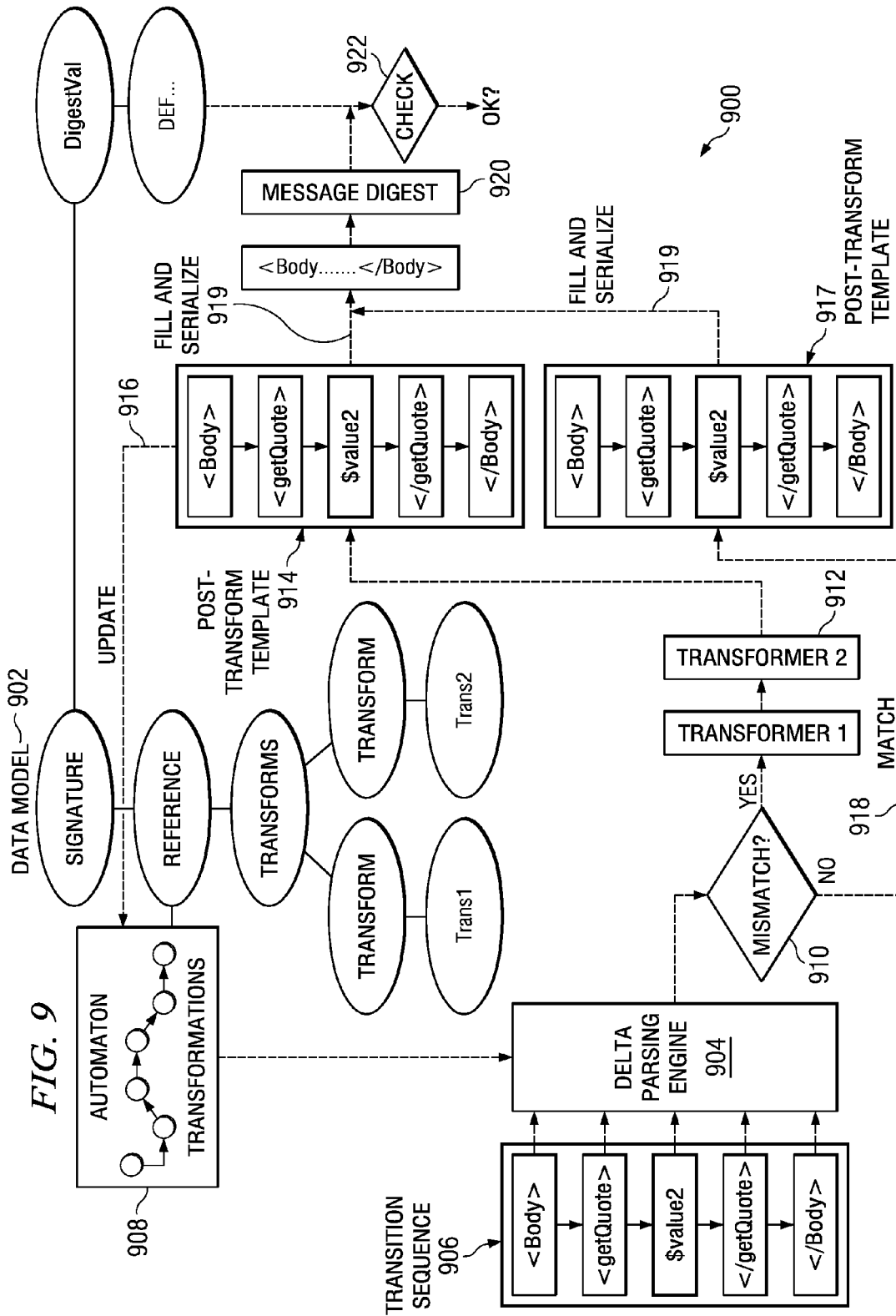
FIG. 9 is a diagram illustrating a process for validating a digest value included in a web services security message in accordance with an illustrative embodiment.

FIG. 9 is a diagram illustrating a process for validating a digest value included in a web services security message in accordance with an illustrative embodiment. Web Services Security processor 900 is a Web Services Security processor on a consumer side. Web Services Security processor 900 verifies integrity of portions of an extensible markup language message based on data model 902 corresponding to the digest element of the extensible markup language message.

Delta parsing engine 904 is a delta parsing engine in Web Services Security processor 900 for performing delta parsing of the extensible markup language message. Delta parsing engine 904 receives transition sequence 906 corresponding to an object to be verified in the extensible markup language message as input. Transition sequence 906 is retrieved from the transition sequence corresponding to the extensible markup language message, such as transition sequence 612 in FIG. 6. Transformations automaton 908 stores the transitions corresponding to one or more extensible markup language messages. Thus, in this example, delta parsing engine 904 matches transition sequence 906 with the transitions cached in transformations automaton 908.

Web Services Security processor 900 makes a determination as to whether transition sequence 906 matches completely with the cached transitions in automaton 908 (step 910). If transition sequence 906 does not match completely with the cached transitions at step 910, Web Services Security processor 900 calls all necessary transforms (step 912) corresponding to the transform information stored in data model 902 and constructs post-transform template 914. A transform is necessary if it is needed to transform an input transition sequence into post-transform template 917. A necessary transform may include, but is not limited to, a canonicalization transform.

Next, Web Services Security processor 900 updates transformations automaton 908 with the post-transform template (step 916) for use in processing future transformations.

Returning to step 910, if the transition sequence does match with the cached transitions, Web Services Security processor 900 generates post-transform template 917 based on the results of delta parsing performed by delta parsing engine 904 and the cached transforms (step 918). Post-transform template 917 is the same as post-transform template 914 because using the cached transforms leads to the same result as the transformations operation performed in step 912.

In other words, the meaning of the XPath® expression in the transformation operations performed in step 912 will always result in post-transform template 914 that is the same as post-transform template 917 generated based on the cached transforms and the results of delta parsing because the constant values in the cached transforms remain consistent from one extensible markup language message to the next. XPath® is a language used to locate elements and attributes in an extensible markup language document. The variable values that do not remain consistent are identified by delta parsing the extensible markup language message. Thus, we can skip transformations step 912 and use the cached transforms to reduce the number of processor cycles required to generate the post-transform template. Therefore, Web Services Security processor 900 can skip the transformations operation when it receives an extensible markup language message that has the same or similar structure. The details of how to construct a post-transform template are shown below in FIG. 10.

Web Services Security processor 900 populates the actual value of all variable parts in the post-transform template and serializes the template (step 919). Serialization refers to encoding data structures as a series of bytes. Web Services Security processor 900 calls message digest 920 to calculate the digest value of the serialized byte array derived in step 919. Web Services Security processor 900 then checks or compares the digest value of the serialized byte array to the digest value stored in the data model (step 922). If the digest value matches the stored value, then the message is verified using the data model.

Figure 10:
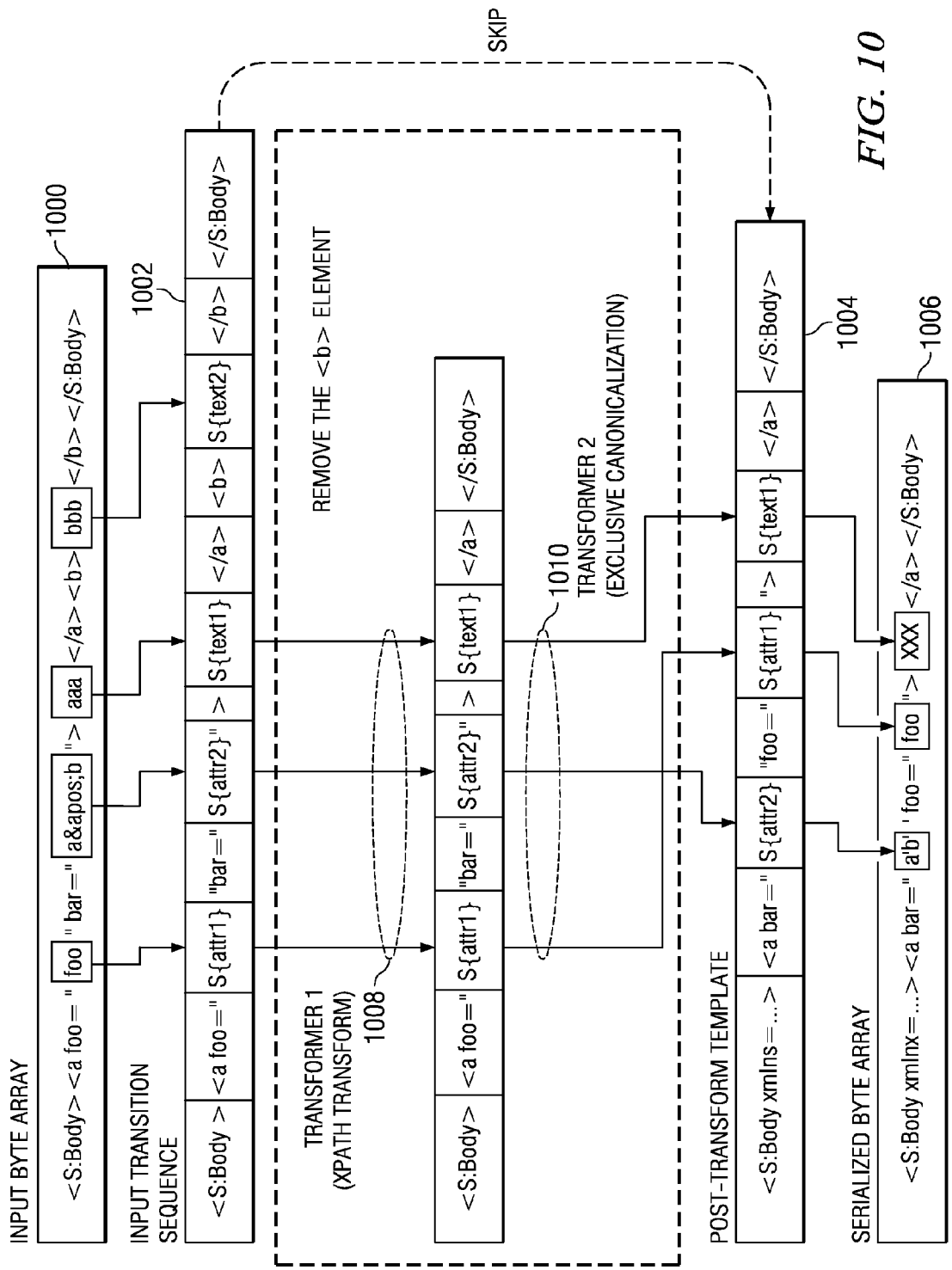
FIG. 10 is a diagram illustrating a construction of a post-transform template in accordance with an illustrative embodiment.

FIG. 10 is a diagram illustrating a construction of a post-transform template in accordance with an illustrative embodiment. Byte array 1000 is an input byte array associated with a security message. Byte array 1000 is processed to generate post-transform template 1004. Post-transform template 1004 is a post-transform template, such as post-transform template 914 in FIG. 9.

A delta parsing engine, such as delta parsing engine 904 in FIG. 9, treats an input as a transition sequence. Thus, when input transition sequence 1002 for an extensible markup language security message is received by the delta parsing engine, the delta parsing engine determines if input transition sequence 1002 matches a cached transition sequence stored in a transformations automaton. If matching cached transitions are found, the Web Services Security processor uses the results of delta parsing with the cached transforms to generate post-transform template 1004. Web Services Security processor fills or populates post-transform template 1004 with the actual variable values and then performs a serialization operation to form serialized byte array 1006.

However, if cached transitions corresponding to input transition sequence 1002 are not available, the Web Services Security processor calls transformers corresponding to the transform information stored in the data model and constructs post-transform template 1004. In this example, Web Services Security process calls Xpath® transform 1008 and canonicalization transform 1010 to generate post-transform template 1004. The data values in serialized byte array 1006 may then be used to perform verification of integrity of the extensible markup language security message.

Figure 11:
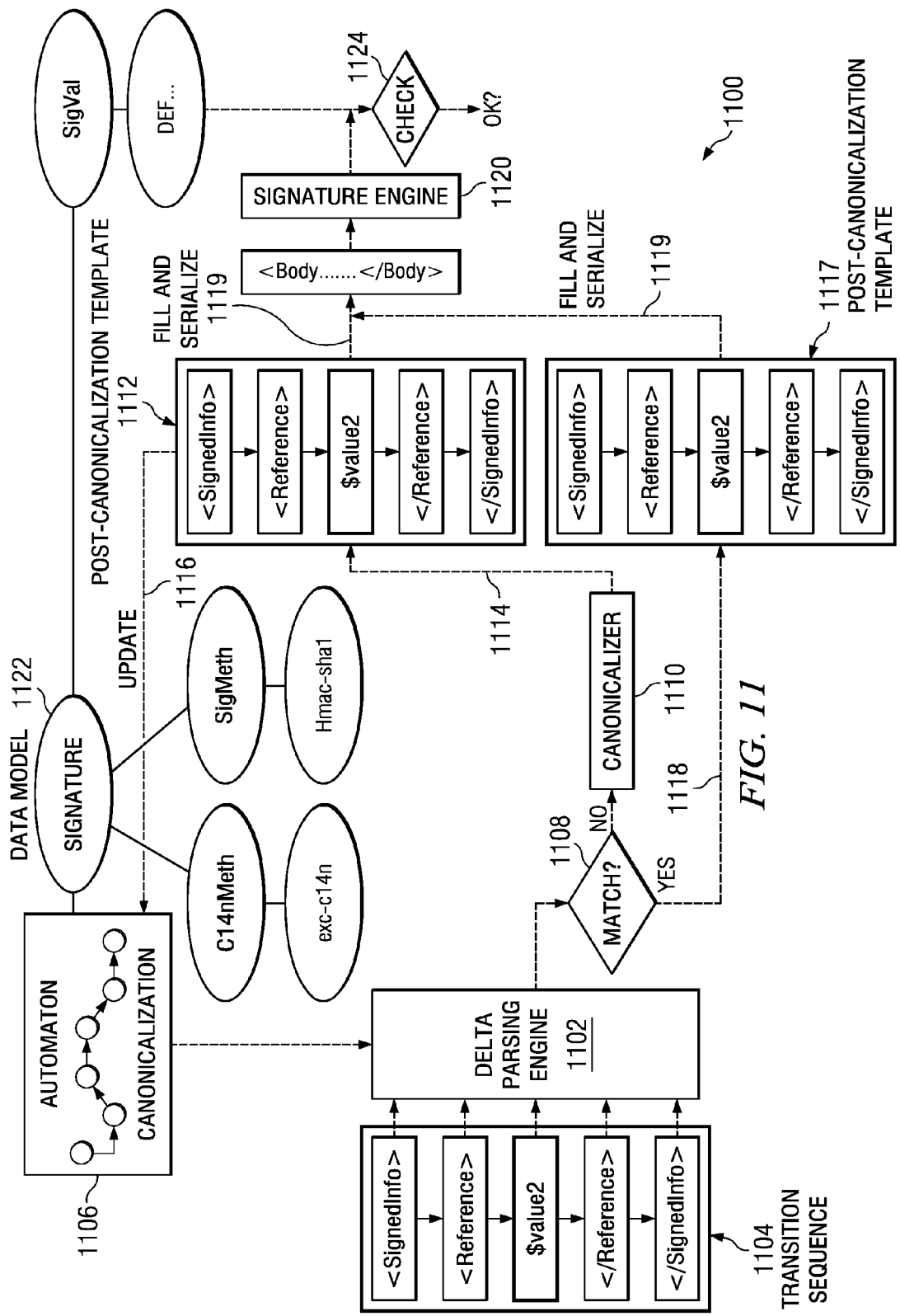
FIG. 11 is a diagram illustrating a process for validating a signature value included in a web services security message based on a lightweight data model in accordance with an illustrative embodiment.

FIG. 11 is a diagram illustrating a process for validating a signature value included in a web services security message based on a lightweight data model in accordance with an illustrative embodiment. Web Services Security processor 1100 is an extensible markup language message processor, such as Web Services Security processor 306 in FIG. 3. Delta parsing engine 1102 of Web Services Security processor 1100 receives transition sequence 1104 corresponding to the signed information element "<ds:SignedInfo>" as input. Delta parsing engine 1102 matches transition sequence 1104 with the transitions cached in canonicalization automaton 1106 (step 1108). If the transition sequence does not match with the cached transitions, Web Services Security processor 1100 calls canonicalizer 1110 and constructs post-canonicalization template 1112 (step 1114). Web Services Security processor 1100 updates canonicalization automaton 1106 with post-canonicalization template 1112 (step 1116) so that Web Services Security processor 1100 can skip the canonicalization operation when it receives a new extensible markup language message in the future that has the same structure as this extensible markup language message.

Returning to step 1108, if the input completely matches with the cached transitions, Web Services Security processor 1100 generates post-canonicalization template 1117 based on the cached transforms and the results of delta parsing (step 1118).

Next, Web Services Security processor 1100 fills the actual values of the variable parts in post-transform template 1112 and serializes the template (step 1119). Serialization refers to encoding data structures as a series of bytes. Web Services Security processor 1100 calls signature engine 1120 to calculate the signature value of the serialized byte array derived in step 1119. Web Services Security processor 1100 then checks or compares the signature value of the serialized byte array with the signature value stored in data model 1122 (step 1124) by passing the serialized byte array derived in step 1119. If the signature value in the byte array matches the signature value in the data model, the digital signature embedded in the extensible markup language message is validated.

Figure 12:
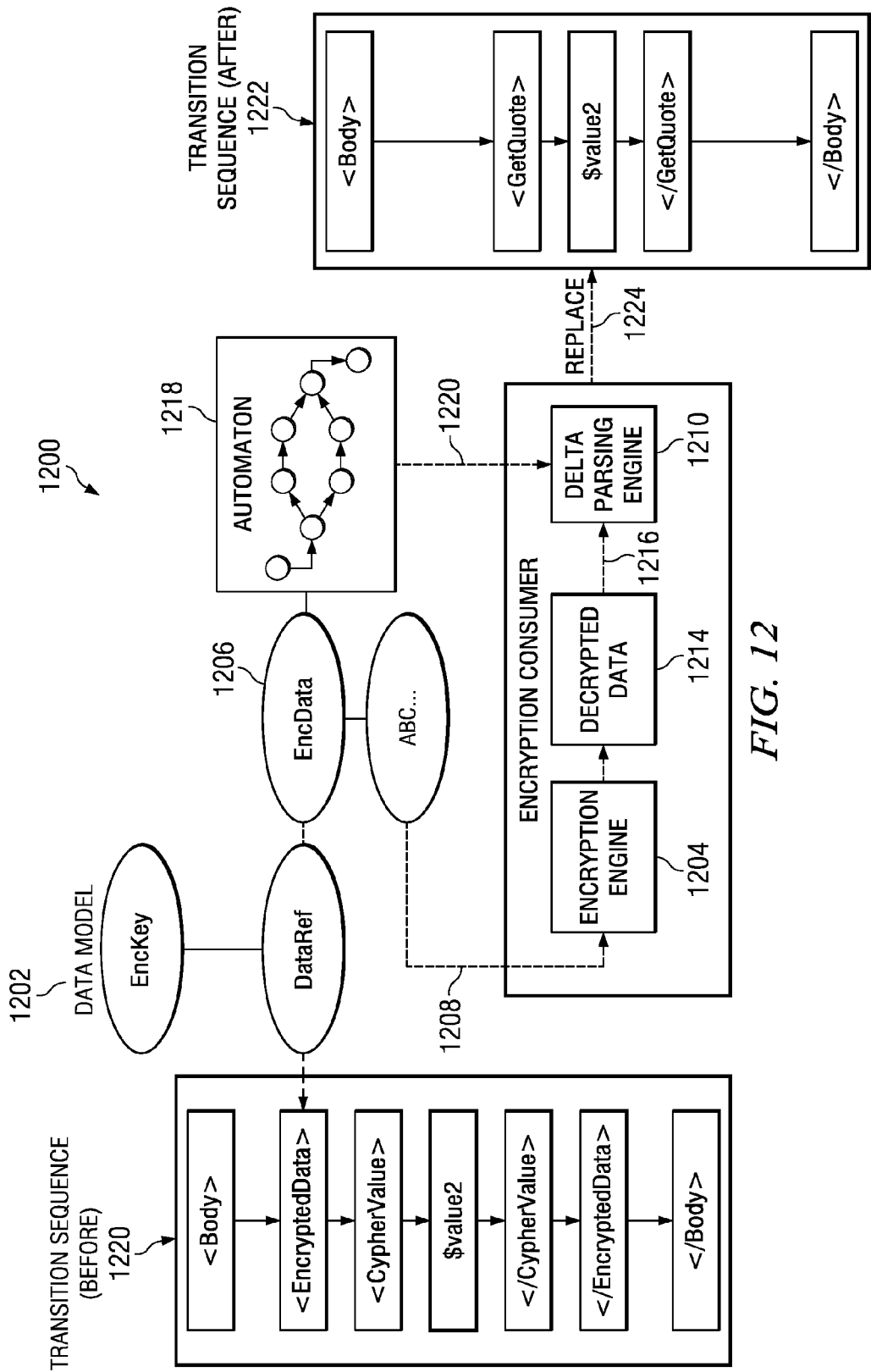
FIG. 12 is a diagram illustrating a process for decrypting encrypted data included in a web services security message based on a lightweight data model in accordance with an illustrative embodiment.

FIG. 12 is a diagram illustrating a process for decrypting encrypted data included in a web services security message based on a lightweight data model in accordance with an illustrative embodiment. Web Services Security processor 1200 is an extensible markup language message processor for decrypting encrypted data in an extensible markup language message, such as Web Services Security processor 306 in FIG. 3. Data model 1202 is a data model representing an encryption element in an extensible markup language message. Web Services Security processor 1200 calls encryption engine 1204 to decrypt encrypted data 1206 stored in data model 1202 (step 1208). Delta parsing engine 1210 receives decrypted data 1214 from encryption engine 1204 (step 1216) and matches decrypted data 1214 with templates cached in automaton 1218 (step 1220). Web Services Security processor 1200 replaces transition sequence 1220 that is a result of delta parsing with the corresponding transition sequence 1222 for the encrypted data object (step 1224).

Figure 13:
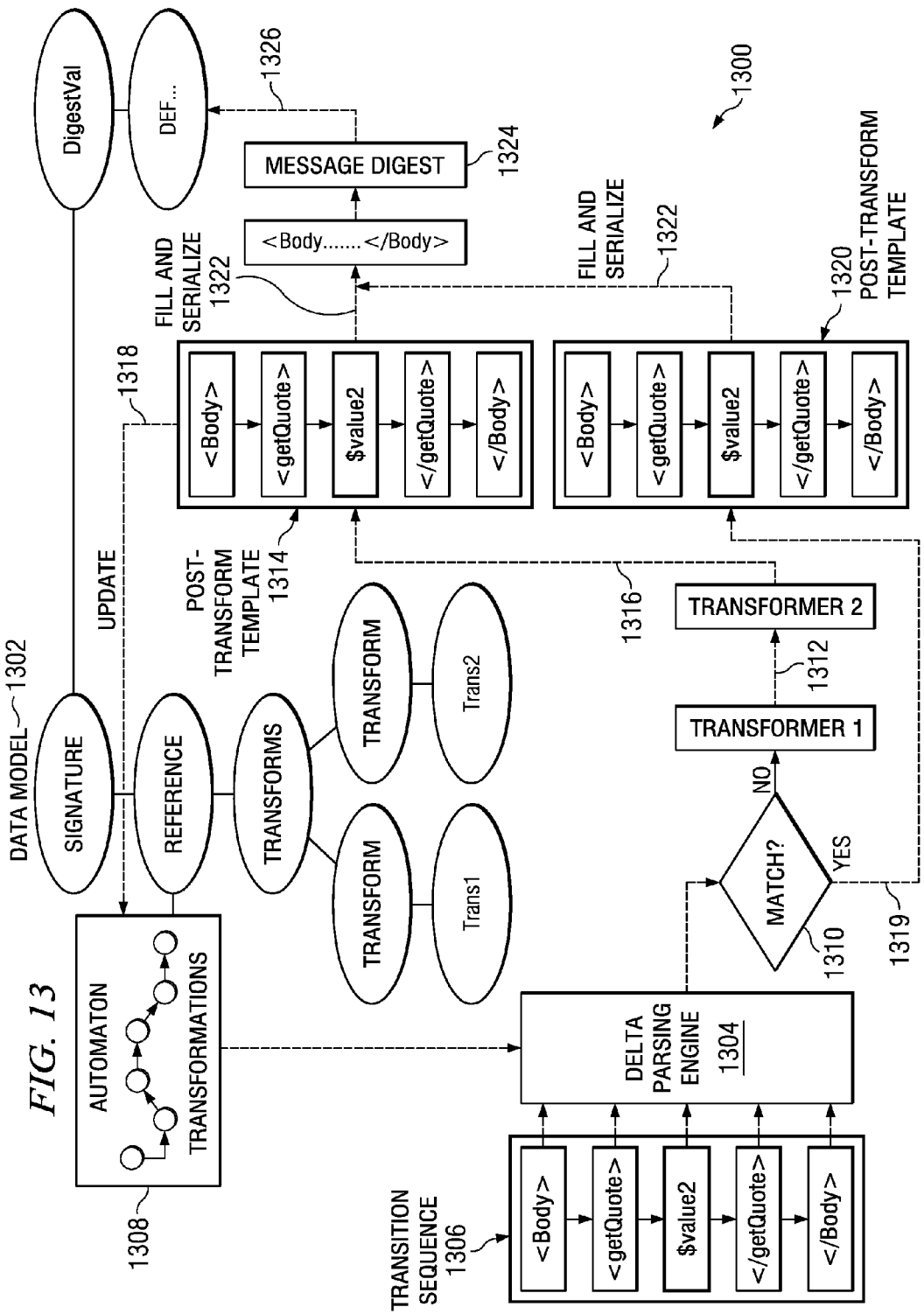
FIG. 13 is a diagram illustrating a process for calculating digest values of a portion of a web services security message based on a lightweight data model in accordance with an illustrative embodiment.

FIG. 13 is a diagram illustrating a process for calculating digest values of a portion of a web services security message based on a lightweight data model in accordance with an illustrative embodiment. Web Services Security processor 1300 is an extensible markup language processor for calculating digest values of portions of an extensible markup language message, such as Web Services Security processor 306 in FIG. 3.

Web Services Security processor 1300 is an extensible markup language message processor on the generator side. Web Services Security processor 1300 signs portions of an outgoing extensible markup language message based on data model 1302. Delta parsing engine 1304 of Web Services Security processor 1300 receives transition sequence 1306 corresponding to an object to be signed in the extensible markup language message as input. Transition sequence 1306 is retrieved from the transition sequence corresponding to the extensible markup language message, such as transition sequence 612 in FIG. 6. Delta parsing engine 1304 makes a determination as to whether transition sequence 1306 matches with the transitions cached in transformations automaton 1308 (step 1310). If transition sequence 1306 does not match with the cached transitions, Web Services Security processor 1300 calls all necessary transformers corresponding to the transform information stored in data model 1302 (step 1312) and constructs post-transform template 1314 (step 1316). Next, Web Services Security processor 1300 updates transformations automaton 1308 with the post-transform template 1314 (step 1318) for use in processing future transformations.

Returning to step 1310, if transition sequence 1306 completely matches with the cached transitions, Web Services Security processor 1300 generates post-transform template 1320 as a result of delta parsing. Web Services Security processor 1300 uses delta parsing to populate the variable values and uses cached transitions sequences to generate post-transform template 1320 (steps 1319). The process in step 1319 results in the exact same post-transform template 1314 generated as a result of performing transformation operations in step 1312. Therefore, Web Services Security processor 1300 can skip transformation operations in step 1312 the next time Web Services Security processor 1300 receives an extensible markup language message that has the same structure as the extensible markup language message being processed in FIG. 13.

Web Services Security processor 1300 fills and serializes the post-transform template (step 1322). Serialization refers to encoding data structures as a series of bytes. Next, Web Services Security processor 1300 calls message digest 1324 to calculate the digest value of the serialized byte array derived in step 1322 and stores the digest value in data model 1302 (step 1326) with the process terminating thereafter.

Figure 14:
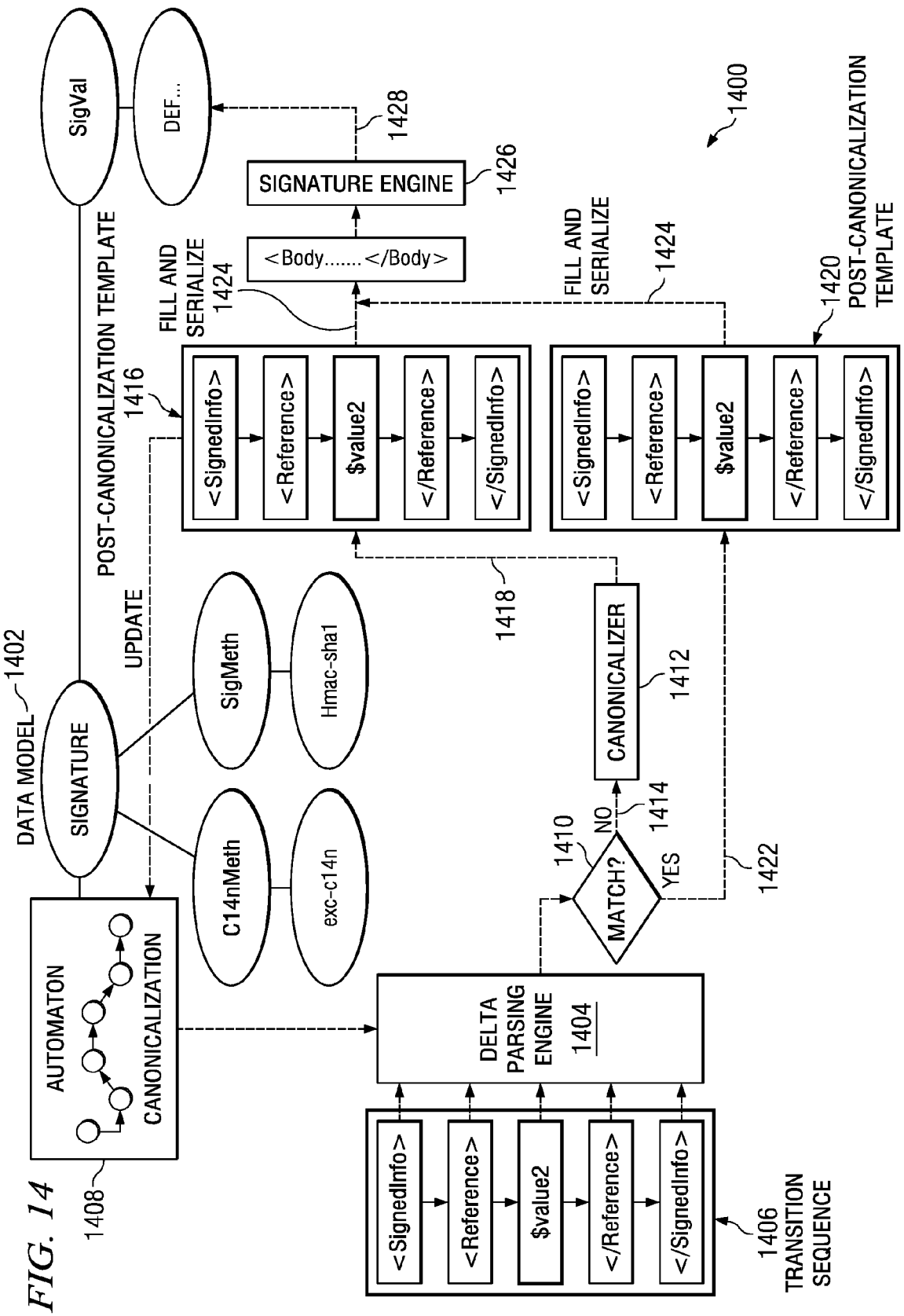
FIG. 14 is a diagram illustrating a process for calculating a signature value based on a lightweight data model in accordance with an illustrative embodiment.

FIG. 14 is a diagram illustrating a process for calculating a signature value based on a lightweight data model in accordance with an illustrative embodiment. Web Services Security processor 1400 is an extensible markup language message processor for calculating a signature value of a "<ds:SignedInfo>" signature information element, such as Web Services Security processor 306 in FIG. 3. Web Services Security processor 1400 calculates a signature value of a "<ds:SignedInfo>" signature information element of an extensible markup language message based on data model 1402.

Delta parsing engine 1404 receives transition sequence 1406 corresponding to the signed information element "<ds:SignedInfo>" as input. Delta parsing engine 1404 makes a determination as to whether transition sequence 1406 matches with transitions cached in canonicalization automaton 1408 (step 1410). If transition sequence 1406 does not match with the cached transitions, Web Services Security processor 1400 calls canonicalizer 1412 (step 1414) and constructs post-canonicalization template 1416 (step 1418). Next, Web Services Security processor 1400 updates canonicalization automaton 1408 with post-canonicalization template 1416 for use in processing future canonicalization. Therefore, Web Services Security processor 1400 can skip canonicalization operations in step 1418 the next time Web Services Security processor 1400 receives an extensible markup language message that has the same structure as the extensible markup language message being processed in FIG. 14.

Returning to step 1410, if transition sequence 1406 completely matches with the cached transitions, Web Services Security processor 1400 generates post-canonicalization template 1420 by using the cached transitions and variable values identified by delta parsing engine 1404 as a result of delta parsing (step 1422). Post-canonicalization template 1420 and post-canonicalization template 1416 is the same post-canonicalization template including the same values.

Web Services Security processor 1400 fills or populates post-canonicalization template 1420 with variable values and serializes the template (step 1424). Serialization refers to encoding data structures as a series of bytes. Next, Web Services Security processor 1400 calls signature engine 1426 to calculate a signature value by passing the serialized byte array derived in step 1424 and stores the signature value in data model 1402 (step 1428) with the process terminating thereafter.

Figure 15:
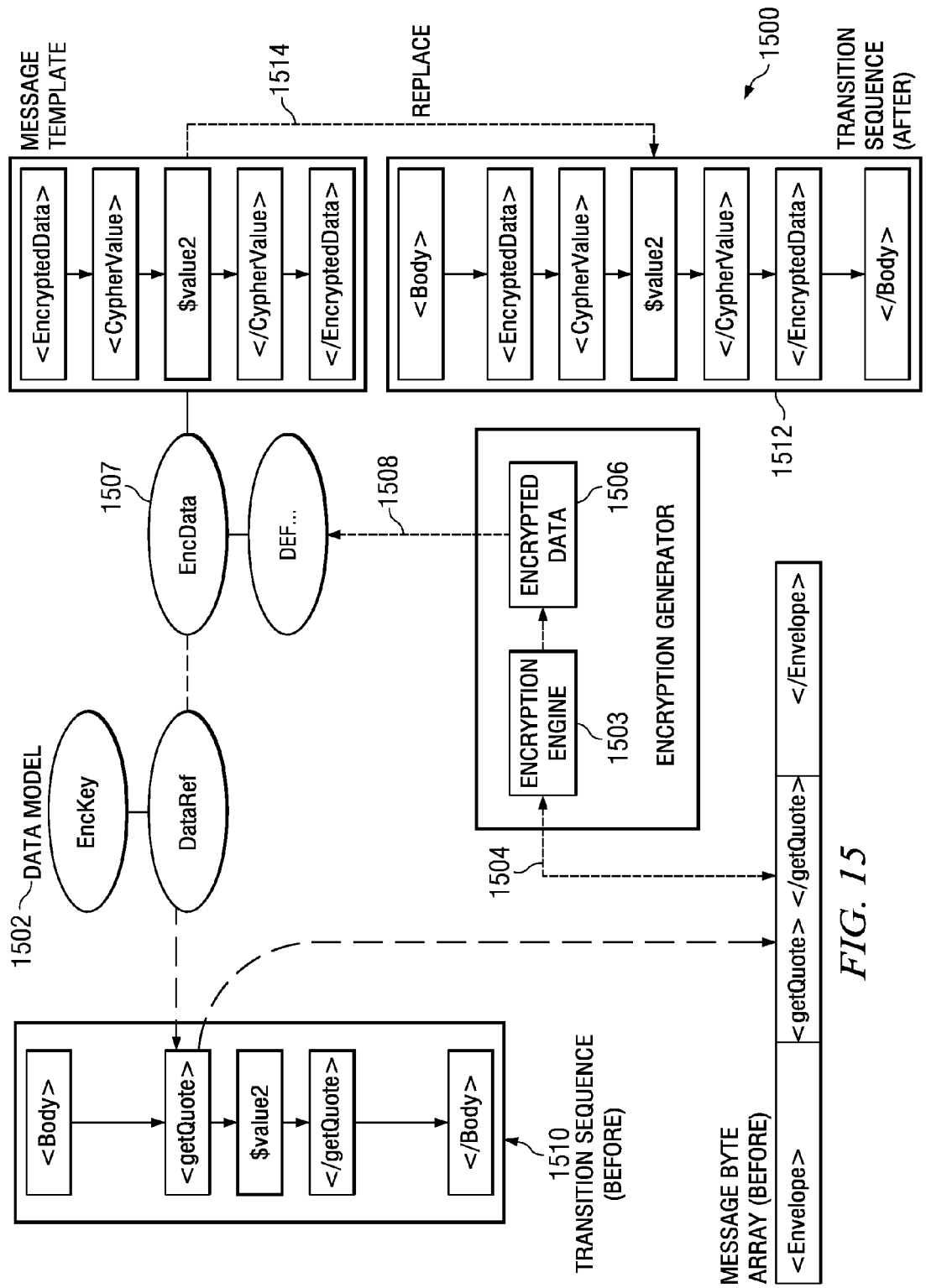
FIG. 15 is a diagram illustrating a process for encrypting a portion of a message based on a lightweight data model in accordance with an illustrative embodiment.

FIG. 15 is a diagram illustrating a process for encrypting a portion of a message based on a lightweight data model in accordance with an illustrative embodiment. Web Services Security processor 1500 is an extensible markup language processor for encrypting a portion of an extensible markup language message, such as Web Services Security processor 306 in FIG. 3. Web Services Security processor 1500 encrypts a portion of an extensible markup language message based on data model 1502.

Web Services Security processor 1500 calls encryption engine 1503 to encrypt a byte array of a portion of an extensible markup language message (step 1504). Web Services Security processor 1500 stores encrypted data 1506 in node 1507 of data model 1502 (step 1508). Web Services Security processor 1500 replaces transition sequence 1510 that is cached in the encrypted data object in data model 1502 with transition sequence 1512 for the encrypting part (step 1514) with the process terminating thereafter.

Figure 16:
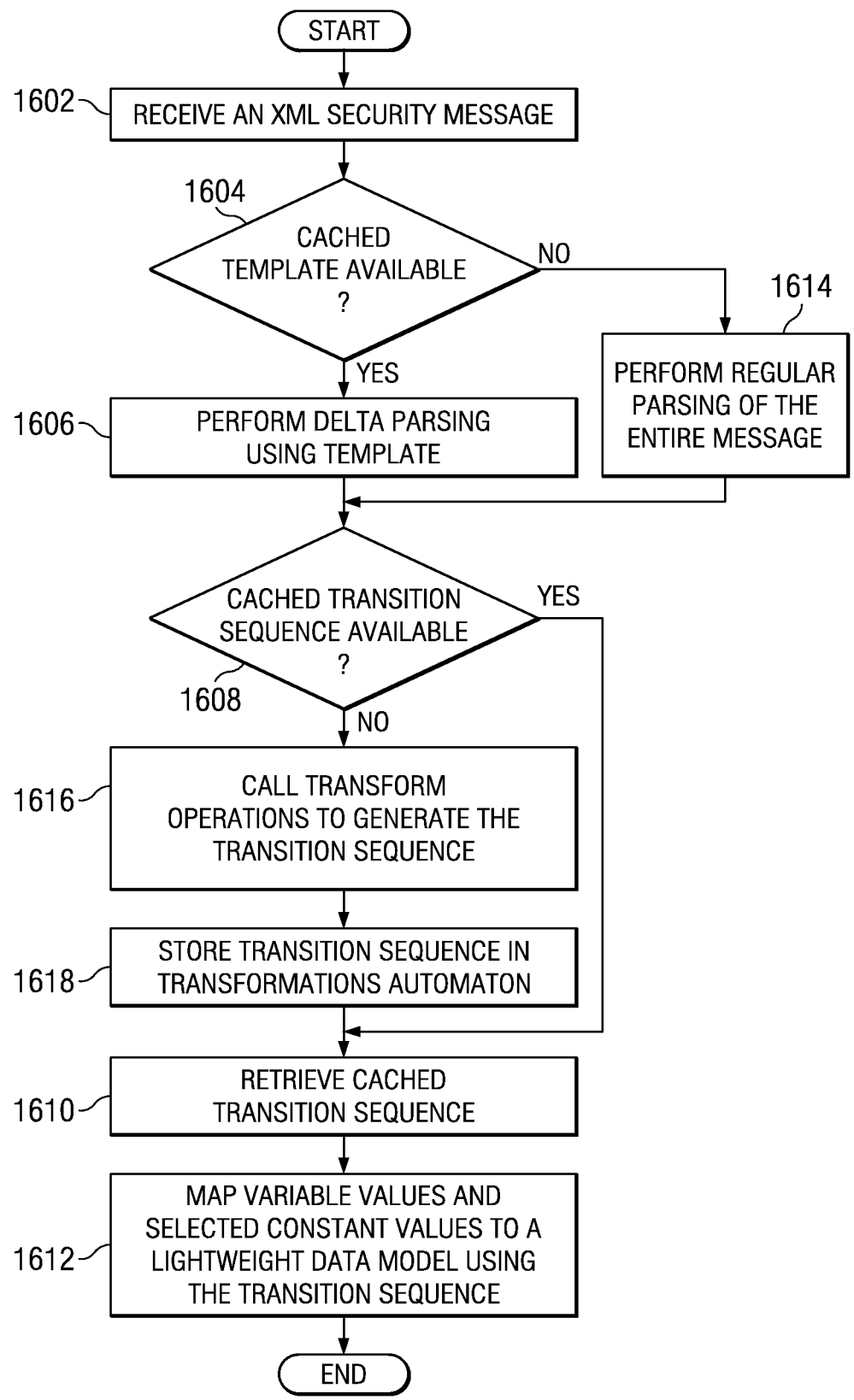
FIG. 16 is a flowchart for a process to generate a lightweight data model for an extensible markup language security message in accordance with an illustrative embodiment.

FIG. 16 is a flowchart for a process to generate a lightweight data model for an extensible markup language security message in accordance with an illustrative embodiment. The generated lightweight data model may be written to a storage device, such as storage 108 in FIG. 1, and/or memory 206 or hard disk drive 226 in FIG. 2. The process shown in FIG. 16 may be implemented by a software component for processing extensible markup language security messages, such as Web Services Security processor 306 in FIG. 3.

The process begins by receiving an extensible markup language security message (step 1602). The process makes a determination as to whether a cached template corresponding to the extensible markup language security message is available (step 1604). If a cached template is available, the process performs delta parsing of the extensible markup language security message using the template (step 1606).

Next, the process determines if a cached transition sequence corresponding to the extensible markup language security message is available in a transformations automaton (step 1608). If a cached transition sequence is available, the process retrieves the cached transition sequence (step 1610). Next, the process maps variable values and selected constant values identified by delta parsing to a lightweight data model using the transition sequence (step 1612) with the process terminating thereafter.

Returning to step 1604, if a cached template corresponding to the extensible markup language security message is not available, the process performs regular parsing of the entire message (step 1614). In one embodiment, after parsing the entire message, the parsing results are used to generate a template which is stored in cache.

Returning now to step 1608, if a cached transition sequence is not available, the process calls all necessary transform operations to generate the transition sequence (step 1616). The process then stores the generated transition sequence in a transformations automaton (step 1618). The process then retrieves the cached transition sequence (step 1610) and maps selected constant values and variable values to a lightweight data model using the transition sequence (step 1612) with the process terminating thereafter.

The illustrative embodiments provide a computer implemented method, apparatus, and computer usable program code for processing extensible markup language security messages. In one embodiment, a template matching an extensible markup language message is identified. The extensible markup language message is parsed for variable values using the template. A transition sequence that represents the entire extensible markup language message is generated. Each transition in the transition sequence is associated with a portion of the extensible markup language message. A lightweight data model for extensible markup language message level security is populated using the transition sequence. The lightweight data model includes nodes for the variable values and a set of selected constant values.

The illustrative embodiments provide an alternative processing model for extensible markup language messaging security to improve extensible markup language message processing performance. This alternative processing model uses delta parsing to avoid unnecessary data handling and unnecessary duplicative processing of extensible markup language message data that remains constant in multiple extensible markup language message elements.

The illustrative embodiments also couple delta parsing with a lightweight data model to reduce the performance overhead. In currently used processing methods, overhead is caused by traversing a document object model type data structure containing every constant and variable data value found in an extensible markup language message to access the variable data. The lightweight data model of the illustrative embodiments includes variable values and a subset of constant values rather than including all constant values from an extensible markup language security message element. Thus, the data structure is more lightweight or smaller than currently used data structures. Therefore, Web Services Security processors expend fewer processor cycles traversing the data model to access variable data and process extensible markup language message data represented by the data model.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for constructing a post-transform template for use with a markup language security message in a light weight data model, comprising:
   a computer receiving an input byte array associated with the markup language security message, wherein the markup language security message includes a security element and encrypted message data;
   the computer determining whether a template corresponding to all of the markup language security message or a portion of the markup language security message is located in an automaton;
   responsive to a determination the template corresponding to all of the markup language security message or a portion of the markup language security message is located in the automaton:
      the computer retrieving a cached lightweight data model corresponding to the markup language security message and a transition sequence that represents all of the markup language security message;
      the computer parsing the transition sequence using a delta parsing engine, to create a first result;
      the computer generating the post-transform template using the first result of the delta parsing engine with cached transforms; and
      the computer storing the post-transform template in the automaton; and
   responsive to a determination the template corresponding to all of the markup language security message or a portion of the markup language security message is not located in the automaton:
      the computer calling transformers corresponding to transform information stored in the cached lightweight data model to construct the post-transform template, wherein a first process calling a transform using an expression conforming to Xpath produces a first transform result and a second process calling a canonicalization transform using the first transform result produces the post-transform template;
      the computer storing the post-transform template in the automaton;
      the computer populating the post-transform template with corresponding actual variable values of the input byte array; and
      the computer performing a serialization operation using the post transform template as populated to form a serialized byte array.

2. The method of claim 1, further comprising:
   the computer using data values in the serialized byte array to verify integrity of the markup language security message.

3. The method of claim 1, wherein the transition sequence contains a transition representing every value in the markup language security message represented by the transition sequence, and wherein each transition in the transition sequence is associated with a portion or snippet of the markup language security message, and each transition represents one of an element, an element tag, a nested sub-element, a nested sub-element tag, a content value, a variable value, a constant value, or an attribute.

4. The method of claim 1, wherein the automaton is a component with capabilities comprising storing one or more cached templates, performing transformations, and performing canonicalization processes associated with processing the markup language security message.

5. The method of claim 1, wherein when one template in the automaton that matches a format or structure of the markup language security message is identified in the automaton, then the transition sequence and data model corresponding to the template identified as a match are also stored in the automaton.

6. The method of claim 1, wherein the computer determining whether a template corresponding to all of the markup language security message or a portion of the markup language security message is located in an automaton further comprises the delta parsing engine treating an input as a transition sequence for the markup language security message received by the delta parsing engine, and wherein the computer determining whether the input treated as a transition sequence matches a cached transition sequence stored in the automaton.

7. The method of claim 1, further comprising:
   the computer, in response to receiving a second markup language security message, determining that a result of a transformation of a previous markup language security message stored in the automaton is a match with the second markup language security message; and
   the computer, in response to determining that the result of the transformation of the previous markup language security message stored in the automaton is the match with the second markup language security message, skipping a second transformation of the second markup language security message.

* * * * *